US007090927B2

(12) United States Patent
Shannon et al.

(10) Patent No.: US 7,090,927 B2
(45) Date of Patent: *Aug. 15, 2006

(54) POLYETHYLENE FILMS

(75) Inventors: Porter C. Shannon, Seabrook, TX (US); Rakesh Kumar, Katy, TX (US); Pradeep Pandurang Shirodkar, Kingwood, TX (US); Fred David Ehrman, Houston, TX (US); Mark B. Davis, Hurricane, WV (US); Keith Wesley Trapp, Houston, TX (US); Dongming Li, Houston, TX (US)

(73) Assignee: Univation Technologies, LLC, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 11/007,863

(22) Filed: Dec. 9, 2004

(65) Prior Publication Data

US 2005/0154168 A1 Jul. 14, 2005

Related U.S. Application Data

(63) Continuation of application No. 10/781,404, filed on Feb. 18, 2004, now Pat. No. 6,878,454.

(60) Provisional application No. 60/527,480, filed on Dec. 5, 2003.

(51) Int. Cl.
*C08F 10/02* (2006.01)
*C08L 23/08* (2006.01)

(52) U.S. Cl. ............... 428/523; 428/35.2; 428/35.5; 428/35.7; 525/191; 525/240

(58) Field of Classification Search .......... 428/523, 428/35.2, 35.5, 35.7, 35.92; 525/191, 240
See application file for complete search history.

(56) References Cited

U.S. PATENT DOCUMENTS

| 4,289,727 A | 9/1981 | Herrington, Jr. .......... 264/173 |
| 4,414,369 A | 11/1983 | Kuroda et al. ............. 526/65 |
| 4,461,873 A | 7/1984 | Bailey et al. .............. 525/240 |
| 4,511,704 A | 4/1985 | Tanaka et al. ............. 526/125 |
| 4,547,551 A | 10/1985 | Bailey et al. .............. 525/240 |
| 5,210,142 A | 5/1993 | Kale et al. ................. 525/240 |
| 5,260,384 A | 11/1993 | Morimoto et al. .......... 525/240 |
| 5,284,613 A | 2/1994 | Ali et al. ................... 264/566 |
| 5,378,764 A | 1/1995 | Benham et al. ............ 525/240 |
| 5,494,965 A | 2/1996 | Harlin et al. ............... 525/52 |
| 5,514,455 A | 5/1996 | Michie, Jr. et al. .......... 428/220 |
| 5,539,076 A | 7/1996 | Nowlin et al. ............. 526/348.1 |
| 5,681,523 A | 10/1997 | Cobler et al. .............. 264/565 |
| 5,739,266 A | 4/1998 | Piana ........................ 528/483 |
| 5,858,491 A | 1/1999 | Geussens et al. .......... 428/36.9 |
| 5,882,750 A | 3/1999 | Mink et al. ................ 428/35.7 |
| 6,201,078 B1 | 3/2001 | Breulet et al. ............. 526/113 |
| 6,316,546 B1 | 11/2001 | Ong et al. .................. 525/53 |
| 6,355,733 B1 | 3/2002 | Williams et al. ........... 525/191 |
| 6,485,662 B1 | 11/2002 | Neubauer et al. .......... 264/169 |
| 6,534,604 B1 | 3/2003 | Loveday et al. ........... 526/113 |
| 6,545,093 B1 | 4/2003 | de Lange et al. .......... 535/191 |
| 6,562,905 B1 | 5/2003 | Nummila-Pakarinen et al. ........................ 525/191 |
| 6,579,922 B1 | 6/2003 | Laurent ..................... 524/240 |

FOREIGN PATENT DOCUMENTS

| WO | WO 99/51649 | 10/1999 |
| WO | WO 02/090393 | 11/2002 |
| WO | WO 03/047839 | 6/2003 |

OTHER PUBLICATIONS

Davey, Chris R. Shirodkar, P.P. and Liu, H.T., "*Engineered Catalyst for Controlled Bimodal Structures in UNIPOL Single Reactor Gas Phase Polyethylene*" Presentation at SPE-Polyolefins 2002 International Conference Feb. 25-27, 2002, published by Univation Technologies LLC.

Peter Fischer, Johannes Wortberg, *Single-Screw Extruders and Barrier Screws*, Extended Version of a paper presented at the VDI conference on "*The Single Screw Extruder—Basics and System Optimization*", published by VDI-Verlag Düsseldorf, 1997-Kunststofftechnik.

F.P. Alt et al., "*Bimodal Polyethylene—Interplay of Catalyst and Process*" 163 Macromol. Symp. 135-143 (2001).

R.A. Sousa, "*Structure Development and Interfacial Interactions in High Density Polyethylene/Hydroxyapatite (HDPE/HA) Composites Molded with Preferred Orientation*" 86 Journal of Applied Science, 2873-2886 (2002).

Bruce A. Davis, et al., "*Grooved Feed Single Screw Extruders—Improving Productivity and Reducing Viscous Heating Effects*", Polymer Engineering and Science, vol. 38, No. 7, 1199-1204 (Jul. 1998).

(Continued)

*Primary Examiner*—Caixia Lu
(74) *Attorney, Agent, or Firm*—Kevin M. Faulkner; Leandro Arechederra

(57) ABSTRACT

A film comprising a polyethylene composition, the polyethylene composition in one embodiment comprising a high molecular weight component having a weight average molecular weight of greater than 50,000 amu and a low molecular weight component having a weight average molecular weight of less than 50,000 amu; the polyethylene composition possessing a density of between 0.940 and 0.970 g/cm$^3$, and an $I_{21}$ value of less than 20 dg/min; characterized in that the polyethylene composition extrudes at an advantageously high specific throughput at an advantageously low melt temperature, and wherein the film has a gel count of less than 100.

40 Claims, 3 Drawing Sheets

OTHER PUBLICATIONS

Y. Guo, et al., "*Dependence of Melt Temperature on Screw Speed and Size in Extrusion,*" SPE Antec, 132-136 (1988).

Film Extrusion Manual, Process Materials, Properties, pp. 133-143 (TAPPI, 1992).

Film Extrusion Manual, Process Materials, Properties, pp. 491-500 (TAPPI, 1992).

H.T. Lue, et al., "*Bimodal Polyethylene Products from UNIPOL™ Single Gas Phase Reactor Using Engineered Catalysts*" 195 Macromol. Symp. 309-316 (Jul. 2003).

Metallocene-Based Polyolefins 366-378 (John Scheirs & W. Kaminsky, eds John Wiley & Sons, Ltd. 2000).

F01552 "HDPE for Blow Film Extrusion" SABIC (Saudi Basic Industries Corp.).

Marlex "High Density Ethylene Hexene Copolymer" Chevron Phillips Chemical (May 2001).

Novapol "HDPE Pipe Extrusion Resin" HD-2007-H, NOVA Chemicals (Apr. 2002).

F.A. Ruiz, "High Performance Mineral Reinforcement Concentrate for LLDPE and HMW-HDPE Blown Film Extrusion" J. of Plastic Film & Sheeting, vol. 18, pp. 25-31 (Jan. 2002).

HTA 001HP2 "ExxonMobil HDPE Blown Film Resin" ExxonMobil Chemical (2003).

HDPE 53050E "Blown Film Resin" Dow Plastics (1997).

F00952EQ "HDPE for Blow Film" SABIC (Saudi Basic Industries Corp.) (2002).

Finathene 2285 and 2287 "High Density Polyethylene" Atofina (2002); Finathene HMW-HDPE Optimization of Blown Film, Atofina Petrochemicals, Inc. (posted petrochemicals.atofina.com 2001-2004).

R. Rasid, et al., "*Effect of process variables on melt temperature profiles in extrusion process using single screw plastics extruder,*" Plastics, Rubber and Composites, vol. 32, No. 5, 187-192 (2003).

Gramann et al., "*Experimental Study of a New Dispersive Mixer,*" SPE Antec, (1999).

BP Solvay Polyethylene "*Fortiflex® HDPE Sheet Extrusion Guide,*" BP Solvay Polyethylene North America, 1-18(2002).

Chris Rauwendall, et al., Troubleshooting the Extrusion Process, 68-69, 96-99 (2001).

Chapman & Hal., Polymer Technology Dictionary, 244 and 533 (1994).

PAXON "High Density Polyethylene BC50-100 Sheet Extrusion and Blow Molding Resin" ExxonMobil Chemical (2004).

TIPLIN "medium and high density polyethylene grades" TVK (Tiszai Vegyi Kombinat Rt.) (2003).

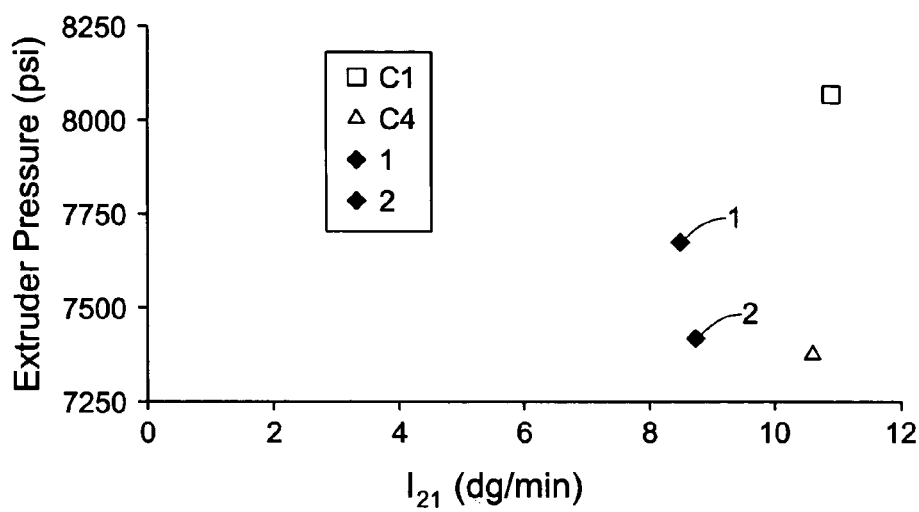
Fig. 1 Extruder Pressure vs. $I_{21}$
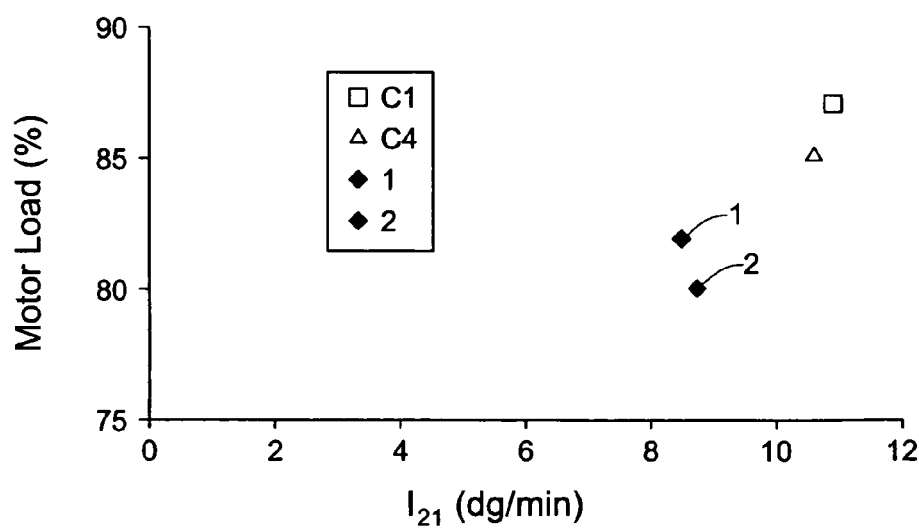
Fig. 2 Extruder Motor Load vs. $I_{21}$

POLYETHYLENE FILMS

CROSS-REFERENCE TO RELATED APPLICATION

The present application is a continuation of and claims priority to U.S. Ser. No. 10/781,404, filed Feb. 18, 2004, now U.S. Pat. No. 6,878,454 which claims priority to provisional U.S. Ser. No. 60/527,480, filed Dec. 5, 2003, herein incorporated by reference.

FIELD OF THE INVENTION

The present invention relates to polyethylene films, and more particularly, relates to bimodal polyethylene compositions useful in films having a low level of film impurities and enhanced processability.

BACKGROUND OF THE INVENTION

High density bimodal polyethylene compositions, and in particular, high density "bimodal" or "multimodal" polyethylenes ("bHDPE"), are known to be useful in making films suitable for a variety of commercial products such as films, pipes, blow molding, etc. However, the costs of producing such compositions is a disadvantage—being relatively high—as most bHDPEs are produced in two stages or more, and/or in two or more staged reactors such as the processes of Dow, Basell, Borealis and Mitsui. Such commercial polymerization systems are reviewed in, for example, 2 METALLOCENE-BASED POLYOLEFINS 366–378 (John Scheirs & W. Kaminsky, eds. John Wiley & Sons, Ltd. 2000).

Further, the processing of bHDPEs can present further commercial problems. For example, it is known that film cooling, upon extrusion of the polyethylene, is a limiting factor in film production, especially for extrusion of high density polyethylene, such as described in FILM EXTRUSION MANUAL, PROCESS, MATERIALS, PROPERTIES, pp. 497 (TAPPI, 1992). One solution to this problem is to operate at a desirably low melt temperature. However, given the bimodal nature of these resins, melting may be uneven, and/or relatively high melt temperatures must be maintained for the given resin. To compensate, high back pressures can be maintained, but this can lead to other problems, and consumes more energy. What would be desirable is a bHDPE that can be extruded at a rapid rate at a relatively low melt temperature, using lower extruder motor loads, while maintaining high film quality.

As a further advantage, it would be desirable to use a low cost process to produce bHDPE. Single reactor systems may offer such a cost advantage. While single reactor systems have been described as capable of producing bimodal polyethylenes for film applications, such as described by H.-T. Liu et al. in 195 MACROMOL. SYMP. 309–316 (July, 2003), those films must still match the quality and processability of current dual-reactor derived polyethylene films for commercial viability. The present invention in one aspect is directed towards such a film, as the inventors have found that a certain balance of polymer properties can meet these commercial needs to produce polyethylene films suitable for cast, blown and other film products; and further, that it is possible to achieve these ends using single-reactor produced polyethylene compositions.

SUMMARY OF THE INVENTION

In one aspect, the present invention provides a film comprising a polyethylene composition, preferably a bimodal polyethylene, possessing a density of between 0.940 and 0.970 g/cm$^3$, and an $I_{21}$ value of less than 20 dg/min; characterized in that the polyethylene composition extrudes at a melt temperature, $T^m$, that satisfies the following relationship: $T^m \leq 235 - 3.3$ ($I_{21}$); wherein the polyethylene composition is extruded at a specific throughput of from 1 (0.454 kg/hr/rpm) to 1.5 lbs/hr/inch (0.681 kg/hr/rpm), and wherein the film has a gel count of less than 100.

In another aspect, the present invention provides a film comprising a polyethylene composition, preferably a bimodal polyethylene, the polyethylene composition comprising a high molecular weight component having a weight average molecular weight of greater than 50,000 amu and a low molecular weight component having a weight average molecular weight of less than 40,000 amu or less than 20,000 amu or less than 15,000 amu or less than 12,000 amu; the polyethylene composition possessing a density of between 0.940 and 0.970 g/cm$^3$, and an $I_{21}$ value of less than 20 dg/min and a Mw/Mn value of from greater than 30 or 35 or 40; characterized in that the film has a gel count of less than 100.

In yet another aspect of the invention, the polyethylene compositions useful for the films of the invention are produced in a single reactor, preferably a single continuous gas phase reactor.

Various aspects of the present invention can be described by any one, or combination, of embodiments describing the polymer composition, extrusion properties of the polymer composition, and film, those embodiments described in more detail herein.

BRIEF DESCRIPTION OF THE FIGURES

FIGS. 1 and 2 are graphical representations of melt index ($I_{21}$) values of the inventive examples 1 and 2 (♦) and comparative examples (Δ, □) versus motor loads and pressures upon extrusion to form a film of 0.5 mil gauge, extruded at a specific throughput of from 1.84 to 1.90 lbs/hr/rpm;

DETAILED DESCRIPTION OF THE INVENTION

Figure 3:
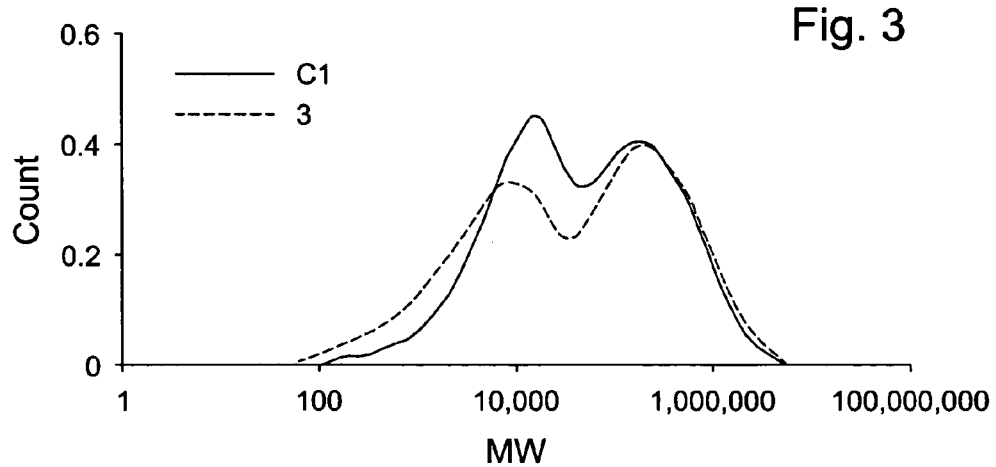
FIGS. 3, 4 and 5 are graphical representations of data obtained from GPC comparing the molecular weight profile of the comparative example 1 (—) with each of inventive examples 3, 4 and 5 (- - - - -)

The present invention is to a film comprising a polyethylene composition, the polyethylene composition in one embodiment comprising a high molecular weight component and a low molecular weight component and, in a particular embodiment, displaying a multimodal or bimodal GPC profile. The polyethylene composition has improved processing properties as exhibited by a decreased extruder motor load (or power consumption) relative to other polyethylene resins of similar density and flow index ($I_{21}$). Further characteristic of the invention is the high specific throughput capabilities at advantageously low melt temperatures. The films described herein possess these improved processing properties while maintaining a high film quality, as exemplified by low gel content, while maintaining the strength, flexibility and impact strength comparable to polyethylenes of similar density and $I_{21}$.

As used herein, the term "film" or "films" includes skins, sheets, or membranes of a thickness of from less than 1000 µm, more preferably from less than 500 µm thickness, and even more preferably less than 200 µm, and most preferably from less than 100 µm, and includes films fabricated by any process known in the art such as by casting or blowing techniques—oriented or not—from an extruded or calendered, preferably extruded, polyethylene as defined herein, and the use of which can include any number of functions such as wrapping, protecting, packaging, bagging, coating, co-extrusion with other materials; and further, may have any commercially desirable dimensions of width, length, etc. The films of the present invention are not limited to transparent films, and may be opaque or translucent or transparent, preferably transparent, and have other properties as defined herein. The films of the present invention may be co-extruded with or otherwise secured to other sheets/structures, etc. to form structures of thickness greater than 1000 µm.

The benefits inherent in the films of the invention—the requirement of lower motor loads in extruding the polymer compositions to form the films, and concomitant with that, the lower melt temperatures achievable, both while maintaining a commercially acceptable specific throughput and high film quality as measured by the low gel levels and/or high FAR values—can be described by any number embodiments such as described herein.

One aspect of the invention is to a film comprising a polyethylene composition possessing a density of between 0.940 and 0.970 g/cm$^3$, and an $I_{21}$ value of from 4 to 20 dg/min; characterized in that the polyethylene composition extrudes at a melt temperature, $T_m$, that satisfies the following relationship (I):

$$T_m \leq 235 - 3.3(I_{21}) \qquad (I)$$

wherein the polyethylene composition is extruded at a specific throughput of from 1 (0.454 kg/hr/rpm) to 1.5 lbs/hr/rpm (0.681 kg/hr/rpm), and wherein the film has a gel count of less than 100. The value "$I_{21}$" is understood to be multiplied by the number "3.3". In another embodiment of (I), the melt temperature is described by the relationship $T_m \leq 240 - 3.3$ ($I_{21}$); and in another embodiment, $T_m \leq 240 - 3.5$ ($I_{21}$); and in yet another embodiment, $T_m \leq 235 - 3.5$ ($I_{21}$). The melt temperature is the temperature at the downstream end of the mixing zone of the extruder used in processing the polyethylene composition to form the films of the invention. In this aspect of the invention, the melt temperatures are determined from an extrusion line suitable to form the film as described herein.

In one embodiment, the polyethylene composition can be described as extruding at a specific throughput of from 1.00 lbs polyethylene/hr/rpm (0.454 kg/hr/rpm) to 1.45 lbs polyethylene/hr/rpm (0.648 kg/hr/rpm) at a melt temperature $T_m$ satisfying the equation $T_m \leq 235 - 3.3$ ($I_{21}$).

In another embodiment, the polyethylene composition extrudes at a specific throughput of from 1.00 lbs polyethylene/hr/rpm (0.454 kg/hr/rpm) to 1.40 lbs polyethylene/hr/rpm (0.636 kg/hr/rpm) at a melt temperature $T_m$ satisfying the equation $T_m \leq 235 - 3.3$ ($I_{21}$).

In yet another embodiment, the polyethylene composition extrudes at a specific throughput of from 1.00 lbs polyethylene/hr/rpm (0.454 kg/hr/rpm) to 1.30 lbs polyethylene/hr/rpm (0.590 kg/hr/rpm) at a melt temperature $T_m$ satisfying the equation $T_m \leq 235 - 3.3$ ($I_{21}$). In another embodiment, the lower specific throughput limit is 1.10 lbs polyethylene/hr/rpm (0.499 kg/hr/rpm).

Examples of desirable melt temperatures $T_m$ for the polyethylene compositions of the present invention are values less than 206° C. or 204° C. or 202° C. or 200° C. or 198° C. or 196° C. or 190° C. or 188° C. or 186° C. or 184° C. or 182° C. or 180° C. or 179° C., and in another embodiment, a melt temperature of at least 170° C. or at least 175° C. In another embodiment, the lower melt temperature limit is the minimum melt temperature required to obtain films described herein at the specific throughputs or specific die rates described herein.

In yet another embodiment of the invention, the improved extrusion properties of the films herein can be described in terms of the specific die rates; in a particular embodiment, the advantageous die rates claimed herein are maintained in a 50 mm grooved feed extruder with an L/D of 21:1 in a particular embodiment. Thus, in one embodiment, the film of the invention is formed by extruding the polymer composition at a melt temperature, $T_m$, that satisfies the following relationship $T_m \leq 235 - 3.3$ ($I_{21}$), at a specific die rate of from between 10 and 20 pounds of polymer per hour per inch of die circumference (0.179 to 0.357 kg/hr/mm), and in another embodiment at a specific die rate of from between 10 and 15 pounds of polymer per hour per inch of die circumference (0.179 to 0.268 kg/hr/mm). In this aspect of the invention, the melt temperatures are determined from an extrusion line suitable to form the film as described herein.

In general, the films of the present invention can be described as having improved melt temperatures compared to prior art bHDPEs of $I_{21}$ from 4 to 20 dg/min, regardless of the method of its manufacture or the method of the manufacture of the present polyethylene compositions used to form the films of the invention. The relationship above in (I) is defined for a given set of extruder conditions. In one embodiment, this improvement is expressed more generally in the relationship $T_m \leq T_m^x - 3.3$ ($I_{21}$), where $T_m^x$ is the melt temperature linear extrapolated to the value of $I_{21}=0$ at any given set of extruder conditions. In general, the melt temperature of the polyethylene compositions used to make the films of the invention will have values from 2 to 20° C. lower than that for prior art bHDPEs at the same (within ±2 to ±3 units) of $I_{21}$.

Another aspect of the invention is to a film comprising a polyethylene composition possessing a density of between 0.940 and 0.970 g/cm$^3$, and an $I_{21}$ value of from 4 to 20 dg/min; characterized in that the polyethylene composition extrudes at a melt temperature, $T_m$, that is from 2 or 4 to 10 or 20° C. less than polyethylene compositions of similar density and $I_{12}$, range produced in a dual or multiple-reactor process, and extruded under the same conditions, further characterized in that the film has a gel count of less than 100. Such dual or multi-stage and -reactor processes are know in the art such as described by FP. Alt et al. in 163 MACROMOL. SYMP. 135–143 (2001) and 2 METALLOCENE-BASED POLYOLEFINS 366–378 (2000); and U.S. Pat. No. 6,407,185, U.S. Pat. No. 4,975,485 U.S. Pat. No. 4,511,704. As used herein, the term "multi-reactor polyethylene compositions" refers to polyethylene compositions produced from a staged process comprising the use of two or more reactors in tandem, or to the use of one reactor that is operated in a staged manner, as described in those references above. In this aspect of the invention, it is preferable that the melt temperature of the inventive film is compared to the "multi-reactor polyethylene composition" having an $I_{21}$ value within ±3 dg/min, more preferably within ±2 dg/min, and even more preferably within ±1 dg/min.

In yet another aspect of the invention, the film is described as comprising a polyethylene composition, the polyethylene composition comprising a high molecular weight component having a weight average molecular weight of greater than 50,000 amu and a low molecular weight component having a weight average molecular weight of less than 40,000 amu or less than 20,000 amu or less than 15,000 amu or less than 12,000 amu; the polyethylene composition possessing a density of between 0.940 and 0.970 g/cm$^3$, and an $I_{21}$ value of less than 20 dg/min and a Mw/Mn value of from greater than 30 or 35 or 40; characterized in that the film has a gel count of less than 100. Other characteristics of the polyethylene composition may be further elucidated as described herein.

The quality of the films of the present invention can be characterized by the gel count, as described herein. The films have a gel count of less than 100 in one embodiment, and a gel count of less than 60 in another embodiment, and a gel count of less than 50 in another embodiment, and a gel count of less than 40 in yet another embodiment, and a gel count of less than 35 in yet another embodiment. Described alternately, the films of the present invention have an FAR value of greater than +20 in one embodiment, and greater than +30 in another embodiment, and greater than +40 in yet another embodiment. The films of the present invention can be formed with a gauge variation of from less than 16% of the total thickness in one embodiment, and less than 13% in another embodiment, and from less than 10% in yet another embodiment.

The polyethylene composition used to make the films of the present invention can be extruded at lower power levels and lower pressure, for a given specific throughput and melt temperature, than previously known. For a given extruder, under the same conditions, the polyethylene compositions of the present invention can be extruded at from 1 to 10% lower motor load relative to comparable bimodal polyethylene compositions having, the comparison between resins having a density of between 0.940 and 0.970 g/cm$^3$, and an $I_{21}$ value of less than 20 dg/min. In another embodiment, the improvement is from 2 to 5% lower motor load relative to comparable bimodal polyethylene compositions.

Stated another way, for a given extruder, the polyethylene compositions of the invention having the properties described herein extrude at a motor load of less than 80% the maximum motor load in one embodiment, and less than 77% the maximum motor load in another embodiment, and less than 75% the maximum motor load in yet another embodiment, and between 66 and 80% maximum motor load in yet another embodiment, and between 70 and 77% maximum motor load in yet another embodiment, wherein a desirable range may comprise any combination of any upper % limit with any lower % limit described herein. These advantageous properties exist while maintaining the melt temperatures and specific throughputs described herein.

The films of the present invention possess properties suitable for commercial use. For example the films of the invention have an MD Tensile strength of from 9,000 to 15,000 psi and a TD Tensile strength of from 9,000 to 15,000 psi in one embodiment; and an MD Tensile elongation of from 200 to 350% and TD Tensile elongation of from 200 to 350% in another embodiment, and an MD Elmendorf Tear value of from 10 to 30 g/mil in and a TD Elmendorf Tear value of from 20 to 60 g/mil in yet another embodiment; and a dart impact ($F_{50}$) of greater than 150 g in one embodiment, and greater than 170 g in another embodiment. These values are determined under the test methods described further herein.

In one embodiment of the films of the invention, the polyethylene composition used to produce the films is preferably free of "hard foulant" material. These "hard foulants" are zones of inhomogeneous material within the polyethylene composition matrix that have distinct characteristics. In one embodiment, the hard gels have a melting point (DSC) of from 125° C. to 133° C., and from 126° C. to 132° C. in another embodiment; and further, the hard gels have a $I_{21}$ of less than 0.5 dg/min in one embodiment, and less than 0.4 dg/min in another embodiment; and also have an η (0.1 rad/sec at 200° C.) value of from greater than 1000 Mpoise in one embodiment, and greater than 1200 Mpoise in another embodiment; wherein the hard gels can be characterized by any one or combination of these features. By "free of hard foulant material", it is meant that the hard gels are present, if at all, in an amount no greater than 1 wt % by weight of the total polyethylene composition in one embodiment, and less than 0.01 wt % in another embodiment, and less than 0.001 wt % in yet another embodiment.

Any desirable method of olefin polymerization—for example, gas phase, slurry phase or solution polymerization process—that is known for the polymerization of olefins to form polyolefins is suitable for making the polyethylene composition suitable for the films of the present invention. In one embodiment, two or more reactors in series are used, such as, for example, a gas phase and slurry phase reactor in series, or two gas phase reactors in series, or two slurry phase reactors in series. In another embodiment, a single reactor; preferably, a single gas phase reactor is used. More particularly, this latter embodiment of the present invention comprises incorporating a high molecular weight ("HMW") polyethylene into a low molecular weight ("LMW") polyethylene, simultaneously in a single reactor, to form the polyethylene composition, in the presence of polymerizable monomers and a bimetallic catalyst composition. The "polyethylene composition" in one embodiment is a bimodal polyethylene composition, wherein from greater than 80 wt %, preferably greater than 90% of the monomer derived units of the composition are ethylene and the remaining monomer units are derived from $C_3$ to $C_{12}$ olefins and diolefins, described further herein.

In one embodiment, the LMW polyethylene and HMW polyethylene are incorporated into one another either sequentially or simultaneously, preferably simultaneously from one, two or more reactors of any suitable description; and are incorporated into one another simultaneously in a single polymerization reactor in a particular embodiment. In a preferred embodiment of the invention, the polymerization reactor used to make the polyethylene composition is a fluidized-bed, gas phase reactor such as disclosed in U.S. Pat. Nos. 4,302,566, 5,834,571, and 5,352,749 typically comprising at least one reactor, only one reactor in a particular embodiment.

In one embodiment, the LMW polyethylene is a polyethylene homopolymer or copolymer comprising from 0 to 10 wt % $C_3$ to $C_{10}$ α-olefin derived units, and more particularly, a homopolymer of ethylene or copolymer of ethylene and 1-butene, 1-pentene or 1-hexene derived units. The LMW polyethylene can be characterized by a number of factors. The weight average molecular weight of the LMW polyethylene ranges from less than 50,000 amu in one embodiment, and other embodiments are described further herein.

In one embodiment, the HMW polyethylene is a polyethylene homopolymer or copolymer comprising from 0 to 10 wt % $C_3$ to $C_{10}$ α-olefin derived units, and more particularly, a homopolymer of ethylene or copolymer of ethylene and 1-butene, 1-pentene or 1-hexene derived units. The weight average molecular weight of the HMW polyethylene ranges from greater than 50,000 amu in one embodiment, and other embodiments as described further herein. The polyethylene composition of the invention, comprising at least the HMW and LMW polymers, can also be described by any number of parameters as described herein.

It is known to use polymerization catalysts in the polymerization of olefins into polyolefins. The films of the present invention can be produced by any suitable catalyst composition that provides for the production of the polyethylene compositions and films described herein. In one embodiment, the films are produced from polyethylene compositions produced from a polymerization process using one class of catalyst compounds, or a combination of two or more of a similar class of compounds in another embodiment, or a combination of two or more of differing classes of catalyst compounds in yet another embodiment. In a preferred embodiment, the films comprising the polyethylene compositions described herein are produced in a polymerization process utilizing a bimetallic catalyst composition. Such bimetallic catalyst compositions comprise at least two, preferably two, Group 3 to Group 10 metal-containing compounds, both of which may be the same or different metal with similar or differing coordination spheres, patterns of substitution at the metal center or ligands bound to the metal center. Non-limiting examples of suitable olefin polymerization catalysts, which can be combined in any number of ways to form a bimetallic catalyst composition, include metallocenes, Ziegler-Natta catalysts, metal-amido catalysts as disclosed in, for example, U.S. Pat. Nos. 6,593,438; 6,380,328, U.S. Pat. No. 6,274,684, U.S. Pat. No. 6,333,389, WO 99/01460 and WO 99/46304; and chromium catalysts such as in U.S. Pat. No. 3,324,095, including for example chromium-cyclopentadienyls, chromium oxides, chromium alkyls, supported and modified variants thereof. In another embodiment, the bimetallic catalyst composition is a combination of two or more of the same class of catalyst compounds.

In a particular embodiment, the bimetallic catalyst composition useful in making the polymer compositions described herein comprise a metallocene and a titanium-containing Ziegler-Natta catalyst, an example of which is disclosed in U.S. Pat. No. 5,539,076, and WO 02/090393, each incorporated herein by reference. Preferably, the catalyst compounds are supported, and in a particular embodiment, both catalyst components are supported with a "primary" activator, alumoxane in a particular embodiment, the support in a particular embodiment being an inorganic oxide support.

In one embodiment, a metallocene catalyst component, as part of the bimetallic catalyst composition, produces the LMW polyethylene of the polyethylene composition useful for making the films. The metallocene catalyst compounds as described herein include "full sandwich" compounds having two Cp ligands (cyclopentadienyl and ligands isolobal to cyclopentadienyl) bound to at least one Group 3 to Group 12 metal atom, and one or more leaving group(s) bound to the at least one metal atom. Even more particularly, the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Hereinafter, these compounds will be referred to as "metallocenes" or "metallocene catalyst components".

As used herein, in reference to Periodic Table "Groups" of Elements, the "new" numbering scheme for the Periodic Table Groups are used as in the CRC HANDBOOK OF CHEMISTRY AND PHYSICS (David R. Lide ed., CRC Press 81$^{st}$ ed. 2000).

The metal atom "M" of the metallocene catalyst compound is selected from the group consisting of Groups 4, 5 and 6 atoms in one embodiment, and a Ti, Zr, Hf atoms in yet a more particular embodiment, and Zr in yet a more particular embodiment. The Cp ligand(s) form at least one chemical bond with the metal atom M to form the "metallocene catalyst compound". In one aspect of the invention, the metallocene catalyst components of the invention are represented by the formula (II):

$$Cp^A Cp^B MX_n \qquad (II)$$

wherein M is as described above; each X is bonded to M; each Cp group is chemically bonded to M; and n is 0 or an integer from 1 to 4, and either 1 or 2 in a particular embodiment.

The ligands represented by $Cp^A$ and $Cp^B$ in formula (II) may be the same or different cyclopentadienyl ligands or ligands isolobal to cyclopentadienyl, either or both of which may contain heteroatoms and either or both of which may be substituted by a group R. In one embodiment, $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ of formula (II) may be unsubstituted or substituted with any one or combination of substituent groups R. Non-limiting examples of substituent groups R as used in structure (II) as well as ring substituents in structure (II) include hydrogen radicals, $C_1$ to $C_6$ alkyls, $C_2$ to $C_6$ alkenyls, $C_3$ to $C_6$ cycloalkyls, $C_6$ to $C_{10}$ aryls or alkylaryls, and combinations thereof.

Each X in the formula (II) and (III) is independently selected from the group consisting of halogen ions (fluoride, chloride, bromide), hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in a particular embodiment; and fluoride in yet a more particular embodiment.

In another aspect of the invention, the metallocene catalyst component includes those of formula (I) where $Cp^A$ and $Cp^B$ are bridged to each other by at least one bridging group, (A), such that the structure is represented by formula (III):

$$Cp^A(A)Cp^B MX_n \qquad (III)$$

These bridged compounds represented by formula (III) are known as "bridged metallocenes". $Cp^A$, $Cp^B$, M, X and n in structure (III) are as defined above for formula (II); and wherein each Cp ligand is bonded to M, and (A) is chemically bonded to each Cp. Non-limiting examples of bridging group (A) include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above (for formula (II)) including halogen radicals and iron. More particular non-limiting examples of bridging group (A) are represented by $C_1$ to $C_6$ alkylenes, substituted $C_1$ to $C_6$ alkylenes, oxygen, sulfur, $R'_2C=$, $R'_2Si=$, $-Si(R')_2Si(R'_2)-$, $R'_2Ge=$, $R'P=$ (wherein "=" represents two chemical bonds), where R' is independently selected from the group consisting of hydride, $C_1$ to $C_{10}$ alkyls, aryls and substituted aryls.

In one embodiment, a Ziegler-Natta catalyst component, as part of the bimetallic catalyst composition, produces the HMW polyethylene of the polyethylene composition useful in making the films of the present invention. Ziegler-Natta catalyst compounds are disclosed generally in ZIEGLER CATALYSTS 363–386 (G. Fink, R. Mulhaupt and H. H. Brintzinger, eds., Springer-Verlag 1995); and RE 33,683. Examples of such catalysts include those comprising Group 4, 5 or 6 transition metal oxides, alkoxides and halides, and more particularly oxides, alkoxides and halide compounds of titanium, zirconium or vanadium in combination with a magnesium compound, internal and/or external electron donors (alcohols, ethers, siloxanes, etc.), aluminum or boron alkyl and alkyl halides, and inorganic oxide supports.

In one embodiment, the Ziegler-Natta catalyst is combined with a support material, either with or without the metallocene catalyst component. The Ziegler-Natta catalyst component can be combined with, placed on or otherwise affixed to a support in a variety of ways. In one of those ways, a slurry of the support in a suitable non-polar hydrocarbon diluent is contacted with an organomagnesium compound, which then dissolves in the non-polar hydrocarbon diluent of the slurry to form a solution from which the organomagnesium compound is then deposited onto the carrier. The organomagnesium compound can be represented by the formula RMgR', where R' and R are the same or different $C_2$–$C_{12}$ alkyl groups, or $C_4$–$C_{10}$ alkyl groups, or $C_4$–$C_8$ alkyl groups. In at least one specific embodiment, the organomagnesium compound is dibutyl magnesium.

The organomagnesium and alcohol-treated slurry is then contacted with a transition metal compound in one embodiment. Suitable transition metal compounds are compounds of Group 4 and 5 metals that are soluble in the non-polar hydrocarbon used to form the silica slurry in a particular embodiment. Non-limiting examples of suitable Group 4, 5 or 6 transition metal compounds include, for example, titanium and vanadium halides, oxyhalides or alkoxyhalides, such as titanium tetrachloride ($TiCl_4$), vanadium tetrachloride ($VCl_4$) and vanadium oxytrichloride ($VOCl_3$), and titanium and vanadium alkoxides, wherein the alkoxide moiety has a branched or unbranched alkyl group of 1 to 20 carbon atoms, in a particular embodiment from 1 to 6 carbon atoms. Mixtures of such transition metal compounds may also be used. In a preferred embodiment, $TiCl_4$ or $TiCl_3$ is the starting transition metal compound used to form the magnesium-containing Ziegler-Natta catalyst.

In one embodiment, the Ziegler-Natta catalyst is contacted with an electron donor, such as tetraethylorthosilicate (TEOS), an ether such as tetrahydrofuran, or an organic alcohol having the formula R"OH, where R" is a $C_1$–$C_{12}$ alkyl group, or a $C_1$ to $C_8$ alkyl group, or a $C_2$ to $C_4$ alkyl group, and/or an ether or cyclic ether such as tetrahydrofuran.

The metallocene and Ziegler-Natta components may be contacted with the support in any order. In a particular embodiment of the invention, the first catalyst component is reacted first with the support as described above, followed by contacting this supported first catalyst component with a second catalyst component.

When combined to form the bimetallic catalyst component, the molar ratio of metal from the second catalyst component to the first catalyst component (e.g., molar ratio of Ti:Zr) is a value of from 0.1 to 100 in one embodiment; and from 1 to 50 in another embodiment, and from 2 to 20 in yet another embodiment, and from 3 to 12 in yet another embodiment; and from 4 to 10 in yet another embodiment, and from 4 to 8 in yet another embodiment; wherein a desirable molar ratio of Ti component metal:Zr catalyst component metal is any combination of any upper limit with any lower limit described herein.

The polymerization process used to form the polyethylene compositions useful in making the films of the invention preferably comprises injecting a supported catalyst composition into the polymerization reactor. The catalyst components and activator(s) (metallocene and Ziegler-Natta components) can be combined in any suitable manner with the support, and supported by any suitable means know in the art. Preferably, the catalyst components are co-supported with at least one activator, preferably an alumoxane. Another activator, preferably an alkylaluminum, is co-injected into the polymerization reactor as a distinct component in another embodiment. In a most preferred embodiment, the bimetallic catalyst composition, preferably comprising a metallocene and Ziegler-Natta catalyst component, is injected into a single reactor, preferably a fluidized bed gas phase reactor, under polymerization conditions suitable for producing a bimodal polyethylene composition as described herein.

Supports, methods of supporting, modifying, and activating supports for single-site catalyst such as metallocenes is discussed in, for example, by G. G. Hlatky in 100(4) CHEM. REV. 1347–1374 (2000). The terms "support" as used herein refers to any support material, a porous support material in one embodiment, including inorganic or organic support materials. Particularly preferred support materials include silica, alumina, silica-alumina, magnesium chloride, graphite, and mixtures thereof in one embodiment. Most preferably, the support is silica. In a particular embodiment, the support is an inorganic oxide, preferably silica, having an average particle size of less than 50 μm or less than 35 μm and a pore volume of from 0.1 to 1 or 2 or 5 $cm^3/g$.

The support is preferably calcined. Suitable calcining temperatures range from 500° C. to 1500° C. in one embodiment, and from 600° C. to 1200° C. in another embodiment, and from 700° C. to 1000° C. in another embodiment, and from 750° C. to 900° C. in yet another embodiment, and from 800° C. to 900° C. in yet a more particular embodiment, wherein a desirable range comprises any combination of any upper temperature limit with any lower temperature limit. Calcining may take place in the absence of oxygen and moisture by using, for example, an atmosphere of dry nitrogen. Alternatively, calcining may take place in the presence of moisture and air.

The support may be contacted with the other components of the catalyst system in any number of ways. In one embodiment, the support is contacted with the activator to form an association between the activator and support, or a "bound activator". In another embodiment, the catalyst component may be contacted with the support to form a "bound catalyst component". In yet another embodiment, the support may be contacted with the activator and catalyst component together, or with each partially in any order. The components may be contacted by any suitable means as in a solution, slurry, or solid form, or some combination thereof, and may be heated when contacted to from 25° C. to 250° C.

In one embodiment, the bimetallic catalyst composition comprises at least one, preferably one, type of activator. As used herein, the term "activator" is defined to be any compound or combination of compounds, supported or unsupported, which can activate a single-site catalyst compound (e.g., metallocenes, metal amido catalysts, etc.), such as by creating a cationic species from the catalyst component. Embodiments of such activators include Lewis acids such as cyclic or oligomeric poly(hydrocarbylaluminum oxides). Preferably, the activator is an alumoxane, and more preferably, an alumoxane supported on an inorganic oxide support material, wherein the support material has been calcined prior to contacting with the alumoxane.

An alkylaluminum is also added, preferably to the polymerization reactor, as an activator of the Ziegler-Natta component of the bimetallic catalyst in one embodiment. The alkylaluminum activator may be described by the formula $AlR^§_3$, wherein $R^§$ is selected from the group consisting of $C_1$ to $C_{20}$ alkyls, $C_1$ to $C_{20}$ alkoxys, halogen (chlorine, fluorine, bromine) $C_6$ to $C_{20}$ aryls, $C_7$ to $C_{25}$ alkylaryls, and $C_7$ to $C_{25}$ arylalkyls. Non-limiting examples of alkylaluminum compounds include trimethylaluminum, triethylaluminum, triisobutylaluminum, tri-n-hexylaluminum, tri-n-octylaluminum and the like. The alkylaluminum is preferably not supported on the support material with the catalyst components and "primary" activator (e.g., alumoxane), but is a separate component added to the reactor(s).

The alkylaluminum compound, or mixture of compounds, such as trimethylaluminum or triethylaluminum is feed into the reactor in one embodiment at a rate of from 10 wt. ppm to 500 wt. ppm (weight parts per million alkylaluminum feed rate compared to ethylene feed rate), and from 50 wt. ppm to 400 wt. ppm in a more particular embodiment, and from 60 wt. ppm to 300 wt. ppm in yet a more particular embodiment, and from 80 wt. ppm to 250 wt. ppm in yet a more particular embodiment, and from 75 wt. ppm to 150 wt. ppm in yet another embodiment, wherein a desirable range may comprise any combination of any upper limit with any lower limit.

Other primary or separately injected activators known in the art may also be useful in making the bimetallic catalyst compositions described herein. Ionizing activators are well known in the art and are described by, for example, Eugene You-Xian Chen & Tobin J. Marks, *Cocatalysts for Metal-Catalyzed Olefin Polymerization: Activators, Activation Processes, and Structure-Activity Relationships* 100(4) CHEMICAL REVIEWS 1391–1434 (2000). Illustrative, not limiting examples of ionic ionizing activators include trialkyl substituted ammonium salts such as triethylammonium tetra (phenyl)boron and the like; N,N-dialkyl anilinium salts such as N,N-dimethylanilinium tetra(phenyl)boron and the like; dialkyl ammonium salts such as di-(isopropyl)ammonium tetra(pentafluorophenyl)boron and the like; triaryl carbonium salts (trityl salts) such as triphenylcarbonium tetra (phenyl)boron and the like; and triaryl phosphonium salts such as triphenylphosphonium tetra(phenyl)boron and the like, and their aluminum equivalents.

When the activator is a cyclic or oligomeric poly(hydrocarbylaluminum oxide) (i.e., "alumoxane" such as methalumoxane "MAO"), the mole ratio of activator to catalyst component ranges from 2:1 to 100,000:1 in one embodiment, and from 10:1 to 10,000:1 in another embodiment, and from 50:1 to 2,000:1 in yet another embodiment; most preferably, the alumoxane is supported on an inorganic oxide such that, once co-supported with the metallocene, is present in a molar ratio of aluminum(alumoxane):Group 4, 5 or 6 metal (metallocene) from 500:1 to 10:1, and most preferably a ratio of from 200:1 to 50:1.

Any suitable method (type of polymerization reactor and reactor process, i.e., gas, slurry, solution, high-pressure, etc.) of polymerizing olefins to produce polyethylene having the characteristics as described herein can be used. The reactor(s) employing the catalyst system described herein is capable of producing from greater than 500 lbs/hr (230 Kg/hr) in one embodiment, and greater than 1,000 lbs/hr (450 Kg/hr) in another embodiment, and greater than 2,000 lbs/hr (910 Kg/hr) in yet another embodiment, and greater than 10,000 lbs/hr (4500 Kg/hr) in yet another embodiment, greater than 20,000 lbs/hr (9,100 Kg/hr) in yet another embodiment, and up to 500,000 lbs/hr (230,000 Kg/hr) in yet another embodiment.

Preferably, the films of the present invention are extruded and cast or blown from a polyethylene composition formed from a continuous fluidized bed gas phase process, and in particular, utilizing a single fluidized bed reactor in a single stage process. This type of reactor and means for operating the reactor are well known and completely described in, for example, U.S. Pat. Nos. 4,003,712, 4,588,790, 4,302,566, 5,834,571, and 5,352,749. Alternately, the process can be carried out in a single gas phase reactor as described in U.S. Pat. Nos. 5,352,749 and 5,462,999. These later patents disclose gas phase polymerization processes wherein the polymerization medium is fluidized by the continuous flow of the gaseous monomers and alternately a "condensing agent".

An embodiment of a fluid bed reactor useful in the process of forming the polyethylene of the present invention typically comprises a reaction zone and a so-called velocity reduction zone. The reaction zone comprises a bed of growing polyethylene particles, formed polyethylene particles and a minor amount of catalyst particles fluidized by the continuous flow of the gaseous monomer and optionally diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of make-up gas flow may be readily determined by simple experiment. Make up of gaseous monomer to the circulating gas stream is at a rate equal to the rate at which particulate polyethylene product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a recycle line and then through a heat exchanger wherein the heat of polymerization is removed, compressed in a compressor and then returned to the reaction zone. So called "control agents" (e.g., tetrahydrofuran, isopropyl alcohol, molecular oxygen, phenol compounds, ethoxylated amines, etc) may be added to any part of the reactor system as described herein, and in a particular embodiment are introduced into the recycle line, preferably at from 0.1 to 50 wt ppm, and in even a more particular embodiment, introduced into the recycle line upstream of the heat exchanger. These agents are known to aid in reduction of electrostatic charge and/or reactor fouling at the expanded region, recycle line, bottom plate, etc.

In one embodiment, the fluidized bulk density of the polyethylene composition forming in the reactor(s) ranges from 16 to 24 lbs/ft$^3$, and from 16.5 to 20 lbs/ft$^3$ in another embodiment. The reactor(s) useful in making the polyethylene compositions of the present invention preferably operate at a space time yield of from 5 to 20 lb/hr/ft³, and more preferably from 6 to 15 lb/hr/ft³. Further, the residence time in the reactor(s), preferably one reactor, ranges from 1 to 7 hrs, and more preferably from 1.2 to 6 hrs, and even more preferably from 1.3 to 4 hrs.

In the fluidized bed gas-phase reactor embodiment, the reactor temperature of the fluidized bed process herein ranges from 70° C. or 75° C. or 80° C. to 90° C. or 95° C. or 100° C. or 110° C., wherein a desirable temperature range comprises any upper temperature limit combined with any lower temperature limit described herein. In general, the reactor temperature is operated at the highest temperature that is feasible, taking into account the sintering temperature of the polyethylene product within the reactor and fouling that may occur in the reactor or recycle line(s).

In the fluidized bed gas-phase reactor embodiment, the gas phase reactor pressure, wherein gases may comprise hydrogen, ethylene and higher comonomers, and other gases, is between 1 (101 kPa) and 100 atm (10,132 kPa) in one embodiment, and between 5 (506 kPa) and 50 atm (5066 kPa) in another embodiment, and between 10 (1013 kPa) and 40 atm (4050 kPa) in yet another embodiment.

The process of the present invention is suitable for the production of homopolymers comprising ethylene derived units, and/or copolymers comprising ethylene derived units and at least one or more other olefin(s) derived units. Preferably, ethylene is copolymerized with α-olefins containing from 3 to 12 carbon atoms in one embodiment, and from 4 to 10 carbon atoms in yet another embodiment, and from 4 to 8 carbon atoms in a preferable embodiment. Even more preferably, ethylene is copolymerized with 1-butene or 1-hexene, and most preferably, ethylene is copolymerized with 1-butene to form the polyethylene composition useful for the films of the invention.

The comonomer may be present at any level that will achieve the desired weight percent incorporation of the comonomer into the finished resin. In one embodiment of polyethylene production, the comonomer is present with ethylene in the circulating gas stream in a mole ratio range of from 0.005 (comonomer:ethylene) to 0.100, and from 0.0010 to 0.050 in another embodiment, and from 0.0015 to 0.040 in yet another embodiment, and from 0.018 to 0.035 in yet another embodiment.

Hydrogen gas may also be added to the polymerization reactor(s) to control the final properties (e.g., $I_{21}$ and/or $I_2$, bulk density) of the polyethylene composition. In one embodiment, the mole ratio of hydrogen to total ethylene monomer ($H_2:C_2$) in the circulating gas stream is in a range of from 0.001 or 0.002 or 0.003 to 0.014 or 0.016 or 0.018 or 0.024, wherein a desirable range may comprise any combination of any upper mole ratio limit with any lower mole ratio limit described herein. Expressed another way, the amount of hydrogen in the reactor at any time may range from 1000 ppm to 20,000 ppm in one embodiment, and from 2000 to 10,000 in another embodiment, and from 3000 to 8,000 in yet another embodiment, and from 4000 to 7000 in yet another embodiment, wherein a desirable range may comprise any upper hydrogen limit with any lower hydrogen limit described herein.

The bimetallic catalyst composition may be introduced into the polymerization reactor by any suitable means regardless of the type of polymerization reactor used. In one embodiment, the bimetallic catalyst composition is feed to the reactor in a substantially dry state, meaning that the isolated solid form of the catalyst has not been diluted or combined with a diluent prior to entering the reactor. In another embodiment, the catalyst composition is combined with a diluent and feed to the reactor; the diluent in one embodiment is an alkane such as a $C_4$ to $C_{20}$ alkane, toluene, xylene, mineral or silicon oil, or combinations thereof, such as described in, for example, U.S. Pat. No. 5,290,745.

The bimetallic catalyst composition may be combined with up to 2.5 wt % of a metal-fatty acid compound in one embodiment, such as, for example, an aluminum stearate, based upon the weight of the catalyst system (or its components), such as disclosed in U.S. Pat. No. 6,608,153. Other suitable metals useful in combination with the fatty acid include other Group 2 and Group 5–13 metals. In an alternate embodiment, a solution of the metal-fatty acid compound is fed into the reactor. In yet another embodiment, the metal-fatty acid compound is mixed with the catalyst and fed into the reactor separately. These agents may be mixed with the catalyst or may be fed into the reactor in a solution or a slurry with or without the catalyst system or its components.

In another embodiment, the supported catalyst(s) are combined with the activators and are combined, such as by tumbling and other suitable means, with up to 2.5 wt % (by weight of the catalyst composition) of an antistatic agent, such as an ethoxylated or methoxylated amine, an example of which is Kemamine AS-990 (ICI Specialties, Bloomington Del.).

Figure 4:
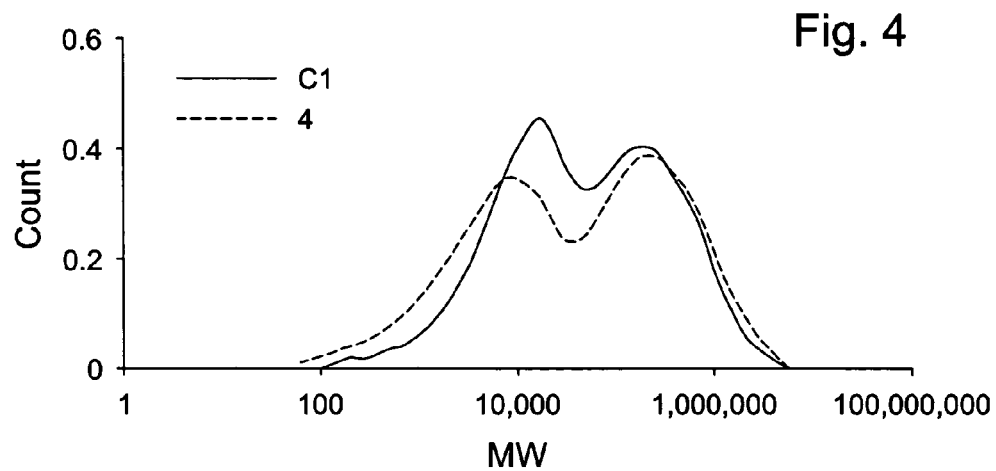
Figure 5:
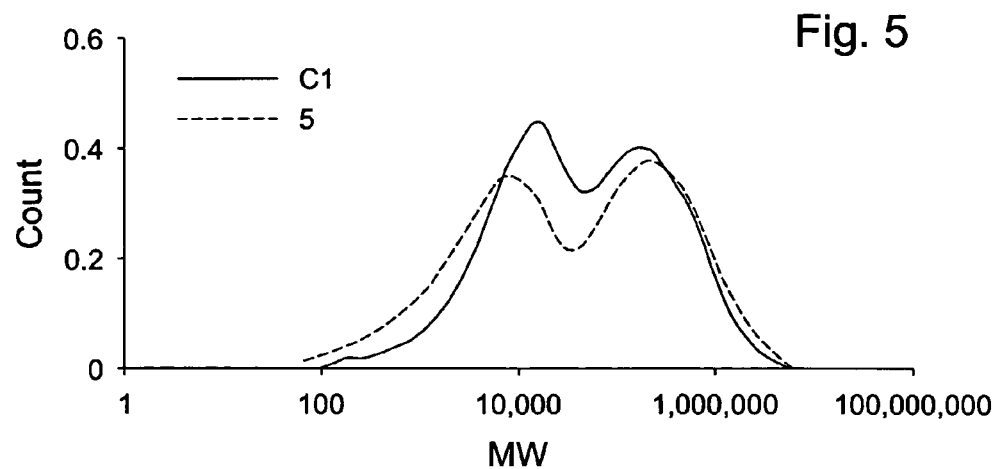

The polyethylene compositions described herein are multimodal or bimodal in one embodiment, preferably bimodal, and comprise at least one HMW polyethylene and at least one LMW polyethylene in a particular embodiment. The term "bimodal," when used to describe the polyethylene composition, means "bimodal molecular weight distribution," which term is understood as having the broadest definition persons in the pertinent art have given that term as reflected in printed publications and issued patents. For example, a single polyethylene composition that includes polyolefins with at least one identifiable high molecular weight distribution and polyolefins with at least one identifiable low molecular weight distribution is considered to be a "bimodal" polyolefin, as that term is used herein. Those high and low molecular weight polymers may be identified by deconvolution techniques known in the art to discern the two polymers from a broad or shouldered GPC curve of the bimodal polyolefins of the invention, and in another embodiment, the GPC curve of the bimodal polymers of the invention may display distinct peaks with a trough as shown in the examples in FIGS. 3–5. The polyethylene compositions of the invention may be characterized by a combination of features.

In one embodiment, the polyethylene composition is a poly(ethylene-co-1-butene) or a poly(ethylene-co-1-hexene), preferably poly(ethylene-co-1-butene), the comonomer present from 0.1 to 5 mole percent of the polymer composition, primarily on the LMW polyethylene of the polyethylene composition.

The polyethylene compositions of the invention have a density in the range of 0.940 g/cm³ to 0.970 g/cm³ in one embodiment, in the range of from 0.942 g/cm³ to 0.968 g/cm³ in another embodiment, and in the range of from 0.943 g/cm³ to 0.965 g/cm³ in yet another embodiment, and in the range of from 0.944 g/cm³ to 0.962 g/cm³ in yet another embodiment, wherein a desirable density range of the polyethylene compositions of the invention comprise any combination of any upper density limit with any lower density limit described herein.

The polyethylene compositions of the present invention can be characterized by their molecular weight characteristics such as measured by GPC, described herein. The polyethylene compositions of the invention have an number average molecular weight (Mn) value of from 2,000 to 70,000 in one embodiment, and from 10,000 to 50,000 in another embodiment, and an weight average molecular weight (Mw) of from 50,000 to 2,000,000 in one embodiment, and from 70,000 to 1,000,000 in another embodiment, and from 80,000 to 800,000 in yet another embodiment. The bimodal polyolefins of the present invention also have a z-average molecular weight (Mz) value ranging from greater than 200,000 in one embodiment, and from greater than 800,000 in another embodiment, and from greater than 900,000 in one embodiment, and from greater than 1,000,000 in one embodiment, and greater than 1,100,000 in another embodiment, and from greater than 1,200,000 in yet another embodiment, and from less than 1,500,000 in yet another embodiment; wherein a desirable range of Mn, Mw or Mz comprises any combination of any upper limit with any lower limit as described herein.

The polyethylene compositions of the invention have a molecular weight distribution, a weight average molecular weight to number average molecular weight ($M_w/M_n$), or "Polydispersity index", of from greater than 30 or 40 in a preferable embodiment; and a range of from 30 to 250 in one embodiment, and from 35 to 220 in another embodiment, and from 40 to 200 in yet another embodiment, wherein a desirable embodiment comprises any combination of any upper limit with any lower limit described herein. The polyethylene compositions also have a "z-average" molecular weight distribution ($M_z/M_w$) of from 2 to 20 in one embodiment, from 3 to 20 in another embodiment, and from 4 to 10 in another embodiment, and from 5 to 8 in yet another embodiment, and from 3 to 10 in yet another embodiment, wherein a desirable range may comprise any combination of any upper limit with any lower limit.

The polyethylene composition of the present invention possess a melt index (MI, or $I_2$ as measured by ASTM-D-1238-E 190° C./2.16 kg) in the range from 0.01 dg/min to 50 dg/min in one embodiment, and from 0.02 dg/min to 10 dg/min in another embodiment, and from 0.03 dg/min to 2 dg/min in yet another embodiment, wherein a desirable range may comprise any upper limit with any lower limit described herein. The polyethylene compositions of the invention possess a flow index (FI or $I_{21}$ as measured by ASTM-D-1238-F, 190° C./21.6 kg) ranging from 4 to 20 dg/min in one embodiment, and from 4 to 18 dg/min in another embodiment, and from 5 to 16 dg/min in yet another embodiment, and from 6 to 14 dg/min in yet another embodiment; and a range of from 6 to 12 dg/min in yet another embodiment, wherein a desirable $I_{21}$ range may comprise any upper limit with any lower limit described herein. The polyethylene compositions in certain embodiments have a melt index ratio ($I_{21}/I_2$) of from 80 to 400, and from 90 to 300 in another embodiment, and from 100 to 250 in yet another embodiment, and from 120 to 220 in yet another embodiment, wherein a desirable $I_{21}/I_2$ range may comprise any combination of any upper limit with any lower limit described herein.

In another embodiment, the polyethylene compositions comprise greater than 50 wt % by weight of the total composition of HMW polyethylene, and greater than 55 wt % in another embodiment, and in another embodiment, between 50 and 80 wt %, and between 55 and 75 wt % in yet another embodiment, and between 55 and 70 wt % in yet another embodiment, the weight percentages determined from GPC measurements.

Further, the polyethylene compositions of the invention possess a dynamic viscosity η at 200° C. and 0.1/sec of from 100 kPoise to 3000 kPoise in one embodiment, 300 kPoise to 1400 kPoise in another embodiment, from 350 kPoise to 1000 kPoise in another embodiment, and from 400 kPoise to 800 kPoise in another embodiment, and from 500 kPoise to 700 kPoise in yet another embodiment. Dynamic viscosity in the examples herein was measured according to ASTM D4440-95 using a nitrogen atmosphere, 1.5 mm die gap and 25 mm parallel plates at 200° C. and 0.1/sec.

In another aspect of the invention, the polyethylene composition useful for making the films has an elasticity of greater than 0.60, and greater than 0.61 in another embodiment, and greater than 0.62 in yet another embodiment, and greater than 0.63 in yet another embodiment.

The individual components of the polyethylene composition may also be described by certain embodiments, and in one embodiment, the polyethylene composition comprises one HMW polyethylene and one LMW polyethylene; and in another embodiment, the polyethylene composition consists essentially of one HMW polyethylene and one LMW polyethylene.

In one embodiment, the molecular weight distribution (Mw/Mn) of the HMW polyethylene ranges from 3 to 24, and ranges from 4 to 24 in another embodiment, and from 6 to 18 in another embodiment, and from 7 to 16 in another embodiment, and from 8 to 14 in yet another embodiment, wherein a desirable range comprises any combination of any upper limit with any lower limit described herein. The HMW polyethylene has a weight average molecular weight ranging from greater than 50,000 amu in one embodiment, and ranging from 50,000 to 1,000,000 amu in one embodiment, and from 80,000 to 900,000 amu in another embodiment, and from 100,000 to 800,000 amu in another embodiment, and from 250,000 to 700,000 amu in another embodiment, wherein a desirable range comprises any combination of any upper limit with any lower limit described herein. The weight fraction of the HMW polyethylene in the polyethylene composition ranges may be at any desirable level depending on the properties that are desired in the polyethylene composition; in one embodiment the HMW polyethylene weight fraction ranges from 0.3 to 0.7; and from 0.4 to 0.6 in another particular embodiment, and ranges from 0.5 and 0.6 in yet another particular embodiment.

In one embodiment, the molecular weight distribution (Mw/Mn) of the LMW polyethylene ranges from 1.8 to 6, and from 2 to 5 in another embodiment, and from 2.5 to 4 in yet another embodiment, wherein a desirable range comprises any combination of any upper limit with any lower limit described herein. The LMW polyethylene has a weight average molecular weight ranging from 2,000 to 50,000 amu in one embodiment, and from 3,000 to 40,000 in another embodiment, and from 4,000 to 30,000 amu in yet another embodiment wherein a desirable range of LMW polyethylene in the polyethylene composition comprises any combination of any upper limit with any lower limit described herein. In another embodiment, the weight average molecular weight of the LMW polyethylene is less than 50,000 amu, and less than 40,000 amu in another embodiment, and less than 30,000 amu in yet another embodiment, and less than 20,000 amu in yet another embodiment, and less than 15,000 amu in yet another embodiment, and less than 13,000 amu in yet another embodiment. The LMW polyethylene has an $I_2$ value of from 0.1 to 10,000 dg/min in one embodiment, and from 1 to 5,000 dg/min in another embodiment, and from 100 to 3,000 dg/min in yet another embodiment; and an $I_{21}$ of from 2.0 to 300,000 dg/min in one embodiment, from 20 to 150,000 dg/min in another embodiment, and from 30 to 15,000 dg/min in yet another embodiment; wherein for the $I_2$ and $I_{21}$ values, a desirable range comprises any combination of any upper limit with any lower limit described herein. The $I_2$ and $I_{21}$ of the LMW polyethylene may be determined by any technique known in the art; and in one embodiment is determined by deconvolution of the GPC curve.

Granules of polyethylene material are formed from the processes described herein in making the polyethylene composition. Optionally, one or more additives may be blended with the polyethylene composition. With respect to the physical process of producing the blend of polyethylene and one or more additives, sufficient mixing should take place to assure that a uniform blend will be produced prior to conversion into a finished film product. One method of blending the additives with the polyolefin is to contact the components in a tumbler or other physical blending means, the polyolefin being in the form of reactor granules. This can then be followed, if desired, by melt blending in an extruder. Another method of blending the components is to melt blend the polyolefin pellets with the additives directly in an extruder, Brabender or any other melt blending means, preferably an extruder. Examples of suitable extruders include those made by Farrel and Kobe. While not expected to influence the measured properties of the polyethylene compositions described herein, the density, rheological and other properties of the polyethylene compositions described in the Examples are measured after blending additives with the compositions.

Non-limiting examples of additives include processing aids such as fluoroelastomers, polyethylene glycols and polycaprolactones, antioxidants, nucleating agents, acid scavengers, plasticizers, stabilizers, anticorrosion agents, blowing agents, other ultraviolet light absorbers such as chain-breaking antioxidants, etc., quenchers, antistatic agents, slip agents, pigments, dyes and fillers and cure agents such as peroxide.

In particular, antioxidants and stabilizers such as organic phosphites, hindered amines, and phenolic antioxidants may be present in the polyolefin compositions of the invention from 0.001 to 2 wt % in one embodiment, and from 0.01 to 1 wt % in another embodiment, and from 0.05 to 0.8 wt % in yet another embodiment; described another way, from 1 to 5000 ppm by weight of the total polymer composition, and from 100 to 3000 ppm in a more particular embodiment. Non-limiting examples of organic phosphites that are suitable are tris(2,4-di-tert-butylphenyl)phosphite (IRGAFOS 168) and di(2,4-di-tert-butylphenyl)pentaerithritol diphosphite (ULTRANOX 626). Non-limiting examples of hindered amines include poly[2-N,N'-di(2,2,6,6-tetramethyl-4-piperidinyl)-hexanediamine-4-(1-amino-1,1,3,3-tetramethylbutane)symtriazine] (CHIMASORB 944); bis(1, 2,2,6,6-pentamethyl-4-piperidyl)sebacate (TINUVIN 770). Non-limiting examples of phenolic antioxidants include pentaerythrityl tetrakis(3,5-di-tert-butyl-4-hydroxyphenyl) propionate (IRGANOX 1010); 1,3,5-Tri(3,5-di-tert-butyl-4-hydroxybenzyl-isocyanurate (IRGANOX 3114); tris(nonylphenyl)phosphite (TNPP); and Octadecyl-3,5-Di-(tert)-butyl-4-hydroxyhydrocinnamate (IRGANOX 1076); other additives include those such as zinc stearate and zinc oleate.

Fillers may be present from 0.01 to 5 wt % in one embodiment, and from 0.1 to 2 wt % of the composition in another embodiment, and from 0.2 to 1 wt % in yet another embodiment and most preferably, between 0.02 and 0.8 wt %. Desirable fillers include but not limited to titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesiter, carbon black, acetylene black, dolomite, calcium carbonate, talc and hydrotalcite compounds of the ions Mg, Ca, or Zn with Al, Cr or Fe and $CO_3$ and/or $HPO_4$, hydrated or not; quartz powder, hydrochloric magnesium carbonate, glass fibers, clays, alumina, and other metal oxides and carbonates, metal hydroxides, chrome, phosphorous and brominated flame retardants, antimony trioxide, silica, silicone, and blends thereof. These fillers may particularly include any other fillers and porous fillers and supports known in the art.

In total, fillers, antioxidants and other such additives are preferably present to less than 2 wt % in the polyethylene compositions of the present invention, preferably less than 1 wt %, and most preferably to less than 0.8 wt % by weight of the total composition.

In one embodiment, an oxidizing agent is also added during the pelletizing step as a reactive component with the polyethylene composition. In this aspect of the polyethylene compositions of the invention, the compositions are extruded with an oxidizing agent, preferably oxygen, as disclosed in WO 03/047839. In one embodiment, from 0.01 or 0.1 or 1 to 14 or 16 SCFM (standard cubic feet per minute) of oxygen is added to the polyethylene composition during extrusion to form the film, the exact amount depending upon the type of extruder used and other conditions. Stated alternately, from between 10 and 21% by volume of oxygen in an inert gas such as nitrogen is introduced to the extruding polymer composition in one embodiment. In one embodiment, enough oxygen is added to the extruder to raise the $I_{21}/I_2$ value of the polyethylene composition from the reactor(s) by from 1 to 40%, and from 5 to 25% in another embodiment. The pellets produced therefrom are then used to extrude the films of the invention in a separate line, for example, and Alpine line.

The resultant pelletized polyethylene compositions, with or without additives, are processed by any suitable means for forming films: film blowing or casting and all methods of film formation to achieve, for example, uniaxial or biaxial orientation such as described in PLASTICS PROCESSING (Radian Corporation, Noyes Data Corp. 1986). In a particularly preferred embodiment, the polyethylene compositions of the present invention are formed into films such as described in the FILM EXTRUSION MANUAL, PROCESS, MATERIALS, PROPERTIES (TAPPI, 1992). Even more particularly, the films of the present invention are blown films, the process for which is described generally in FILM EXTRUSION MANUAL, PROCESS, MATERIALS, PROPERTIES pp. 16–29, for example.

Any extruder suitable for extrusion of a HDPE (density greater than 0.940 $g/cm^3$) operating under any desirable conditions for the polyethylene compositions described herein can be used to produce the films of the present invention. Such extruders are known to those skilled in the art. Such extruders include those having screw diameters ranging from 30 to 150 mm in one embodiment, and from 35 to 120 mm in another embodiment, and having an output of from 100 to 1,500 lbs/hr in one embodiment, and from 200 to 1,000 lbs/hr in another embodiment. In one embodiment, a grooved feed extruder is used. The extruder may possess a L/D ratio of from 80:1 to 2:1 in one embodiment, and from 60:1 to 6:1 in another embodiment, and from 40:1 to 12:1 in yet another embodiment, and from 30:1 to 16:1 in yet another embodiment.

A mono or multi-layer die can be used. In one embodiment a 50 to 200 mm monolayer die is used, and a 90 to 160 mm monolayer die in another embodiment, and a 100 to 140 mm monolayer die in yet another embodiment, the die having a nominal die gap ranging from 0.6 to 3 mm in one embodiment, and from 0.8 to 2 mm in another embodiment, and from 1 to 1.8 mm in yet another embodiment, wherein a desirable die can be described by any combination of any embodiment described herein. In a particular embodiment, the advantageous specific throughputs claimed herein are maintained in a 50 mm grooved feed extruder with an L/D of 21:1 in a particular embodiment.

The temperature across the zones of the extruder, neck and adapter of the extruder ranges from 150° C. to 230° C. in one embodiment, and from 160° C. to 210° C. in another embodiment, and from 170° C. to 190° C. in yet another embodiment. The temperature across the die ranges from 160° C. to 250° C. in one embodiment, and from 170° C. to 230° C. in another embodiment, and from 180° C. to 210° C. in yet another embodiment.

Thus, the films of the present invention can be described alternately by any of the embodiments disclosed herein, or a combination of any of the embodiments described herein. Embodiments of the invention, while not meant to be limiting by, may be better understood by reference to the following examples.

EXAMPLES

The following examples relate to gas phase polymerization procedures carried out in a fluidized bed reactor capable of producing from greater than 500 lbs/hr (230 Kg/hr) at a production rate of from 8 to 40 T/hr or more, utilizing ethylene and 1-butene comonomer, resulting in production of the polyethylene composition. The tables identify various samples of resin and films made from those samples, along with the reported reaction conditions during the collection of the samples ("examples"). Various properties of the resulting resin products and film products are also identified. Examples 1 and 2 were extruded in the absence of oxygen ("non-tailored") as described below, while the Examples 3–9 were extruded in the presence of oxygen ("oxygen tailored") as per WO 03/047839, herein incorporated by reference. The comparative examples were made into films as received.

The fluidized bed of the reactor was made up of polyethylene granules. The reactor is passivated with an alkylaluminum, preferably trimethylaluminum. During each run, the gaseous feed streams of ethylene and hydrogen were introduced before the reactor bed into a recycle gas line. The injections were downstream of the recycle line heat exchanger and compressor. Liquid 1-butene comonomer was introduced before the reactor bed. The control agent (typically isopropyl alcohol), if any, that influenced resin split and helped control fouling, especially bottom plate fouling, was added before the reactor bed into a recycle gas line in gaseous or liquid form. The individual flows of ethylene, hydrogen and 1-butene comonomer were controlled to maintain target reactor conditions, as identified in each example. The concentrations of gases were measured by an on-line chromatograph.

The examples 1 and 2 were samples taken from a 3–4 day polymerization run on a single gas phase fluidized bed reactor having a diameter of 8 feet and a bed height (from distributor "bottom" plate to start of expanded section) of 38 feet. The examples 3–9 were samples taken from a different 3–4 day polymerization run on a single gas phase fluidized bed reactor having a diameter of 11.3 feet and a bed height (from distributor "bottom" plate to start of expanded section) of 44.6 feet.

In each polymerization run of the inventive examples, supported bimetallic catalyst was injected directly into the fluidized bed using purified nitrogen. Catalyst injection rates were adjusted to maintain approximately constant production rate. In each run, the catalyst used was made with silica dehydrated at 875° C., and metallocene compound $Cp_2MX_2$ wherein Cp is an n-butyl-substituted cyclopentadienyl ring, M is Zirconium; and X is fluoride. The titanium source for the Ziegler-Natta component was $TiCl_4$.

During each run, the reacting bed of growing polyethylene particles was maintained in a fluidized state by a continuous flow of the make-up feed and recycle gas through the reaction zone. As indicated in the tables, each polymerization run for the inventive examples utilized a target reactor temperature ("Bed Temperature"), namely, a reactor temperature of about 95° C. During each run, reactor temperature was maintained at an approximately constant level by adjusting up or down the temperature of the recycle gas to accommodate any changes in the rate of heat generation due to the polymerization.

The example polymer compositions were extruded in a 4 inch Farrel (or Kobe) Continuous Mixer (4UMSD) at rate of 500 lbs/hr, specific energy input of 0.125 HP-Hr/lb to form pellets. An additive package was also added such that the Examples 1–9 polymer compositions comprising 800 ppm (IRGANOX 1010, Pentaerythrityltetrakis-3-(3,5-di-tert-butyl-4-hydroxyphenyl)-Propionate), 200 ppm (IRGAFOS 168, Tris(2,4-di-tert-butyl-phenyl)phosphite) and 1500 ppm zinc stearate. The examples 1 and 2 were extruded in a nitrogen atmosphere (0% Oxygen); examples 3–9 were extruded in the presence of an amount of oxygen as disclosed in WO 03/047839.

The polymer composition properties are described in the tables. The "$I_{21}$:HMW:MFR" is a calculation of the $I_{21}$ of the high molecular weight component from $I_{21}$ and $I_2$ data was based on the following empirical model (IV):

$$I21: HMW:\ MFR = 2.71828^{-0.33759+0.516577*\ln/21 - 0.01523*\frac{I21}{I2}} \quad (IV)$$

where $I_{21}$ and $I_2$ were determined from ASTM standards described herein. The "$I_{21}$:HMW:DSR" is a calculation of the $I_{21}$ of the high molecular weight component from a dynamic viscosity measurement based on the following model (V):

$$FI:HMW:DSR = \eta^*_{0.1} * 2.06694 * 10^{-8} - 4.40828 * \ln(G'_{0.1} * 1.09839) + 5.36175 * \ln(G''_{0.1} * 1.09275) - 0.383985 * \ln(G''_{100} * 1.1197) \quad (V)$$

where $\eta^*_x$ (Poise) is the complex viscosity determined at 200° C. and a frequency of x, G'x ($dyne/cm^2$) is the real component of the shear modulus determined at 200° C. and a frequency of x, and G"x ($dyne/cm^2$) is the imaginary component of the shear modulus determined at 200° C. and a frequency (rad/sec) of x.

These parameters were measured on a Rheometrics Dynamic Stress Rheometer, using 25 mm parallel plates, a die gap of approximately 1.4 mm, measured, a stress of 10,000 $dynes/cm^2$ and the procedure defined in ASTM standard D4440-01 Standard Test Method for Plastics: Dynamic Mechanical Properties: Melt Rheology determinations.

The examples 1 and 2 were extruded blown film line under the conditions listed in Table 2; the extruder screw being a 50 mm 21 d screw with a "LLDPE" feed section (Alpine part no. 171764). The melt temperature $T_m$ was measured by an immersion thermocouple at the adapter section, near the exit of the extruder. Chilled air was applied to the outside of the bubble for cooling purposes.

Other Analytical methods are described:

Film gauge was measured according to ASTM D374-94 Method C;

FI ($I_{21}$): Flow Index ($I_{21}$) was measured as per ASTM D 1238 at 190° C., 21.6 kg;

MI ($I_2$): Melt Index ($I_2$) was measured as per ASTM D 1238 at 190° C., 2.16 kg;

MFR: Melt Flow Ratio is defined as the ratio $I_{21}/I_2$;

Density (g/cm³): was determined using chips cut from plaques compression molded in accordance with ASTM D-4703-00, conditioned in accordance with ASTM D618 Procedure A, and measured according to ASTM D1505-03;

Elasticity: This is internal test method and is defined as ratio of G'/G" measured at 0.1 radians/second. G' and G" are measured on Stress Rheometer (200° C. using a Dynamic Stree Rheometer) when operating under oscillatory shear at a constant stress of 1000 Pa. The values of G' and G" at 0.1 radians/sec is selected for the elasticity number;

η*: Complex viscosity measured on Stress Rheometer at 0.1 radians/sec at 200° C.;

FAR: "Film Appearance Rating" is internal test method in which resin is extruded under standard operating guidelines and the resulting film is examined visually for surface imperfections. The film is compared to a reference set of standard film and a FAR rating is assigned based on operators assessment. This evaluation is conducted by an operator with considerable experience. The FAR reference films are available for the range of –50 to +50 and FAR ratings of +20 and better are considered commercially acceptable by customers;

Gel count: The equipment used consisted of an Optical Control Systems GmbH (OCS) Model ME-20 extruder, and OCS Model CR-8 cast film system, and an OCS Model FS-5 gel counter. The ME-20 extruder consists of a ¾" standard screw with 3/1 compression ratio, and 25/1 L/D. It includes a feed zone, a compression zone, and a metering zone. The extruder utilizes all solid state controls, a variable frequency AC drive for the screw, 5 heating zones including 3 for the barrel, 1 for the melt temperature and pressure measurement zone, and one for the die. The die was a 4" fixed lip die of a "fishtail" design, with a die gap of about 20 mils. The testing was performed by Southern Analytical, Inc., Houston Tex.

The cast film system includes dual stainless steel chrome plated and polished chill rolls, a machined precision air knife, rubber nip rolls that pull the film through the gel counter, and a torque driven wind up roll. The nip rolls are driven separately from the chill rolls and are controlled by speed or tension. A circulation cooling/heating system for the chill rolls was also included, and utilizes ethylene glycol. Steel SS rails, film break sensors, and other items were included. The example 3–9 and C1 films that were measured were from 1 mil (25 µm) in thickness, the comparative films C2, C3 and C5 were 2 mil (50 µm) films.

The gel counter consists of a digital 2048 pixel line camera, a halogen based line lighting system, an image processing computer, and Windows NT4 software. The camera/light system was mounted on the cast film system between the chill roll and nip rolls, and was set up for a 50 micron resolution on film. This means that the smallest defect that could be seen was 50 microns by 50 microns in size.

The pellet samples were run with constant extruder temperatures (180° C. for the feed zone, 190° C. for all remaining zones), and constant chill roll temperature of 40° C. The extruder and chill roll speeds were varied slightly between samples to provide an optimum film for each sample. With more experimentation, one set of operating conditions might be found that are satisfactory for all samples. The gel counter was set up with 10 different size classes beginning at 50–100 microns and increasing at 100 micron intervals, 4 different shape classes beginning with a perfect circular shape and increasing to more oblong shapes, and two detection levels (one for gels and one for black specks). The gel detection level or sensitivity used was 35 on a 0 to 100 scale.

Once the camera set up parameters were determined, the extruder was purged with the first sample (typically about 20 minutes) or until it was apparent that the test conditions were at steady state, or "equilibrium". This was done by looking at a trend line chart of gel count number on the "y" axis, and time on the "x" axis. Tests were then run on 3 square meters of film per test, as the film moved by the camera. Three tests were run in succession on the sample, in order to determine test repeatability. At the end of each 3 square meter test, tabular results were printed. After the purge time, a set of 3 successive 3 square meter tests was performed for the second sample, and results printed.

All gel tests on remaining samples were conducted in this way, except that extruder speed, chill roll speed, and resultant film thickness was varied slightly on some samples. Pictures of the actual gels were also obtained throughout the testing (in what is called a "mosaic" of pictures) in order to make sure that what the analyzer was seeing was really a gel, and also to make sure that no gel were being measured twice or missed. For the granular samples, one set of operating conditions was found that was adhered to for all samples, including film thickness, so that all results could be directly comparable.

The gel counts reported in the tables were normalized to gauge. Each sample was tested three times. The data provided from the test was used to calculate the sum of all gels 200 microns in size or smaller. The three runs from each sample were averaged, then that average divided by the gauge in mils. The gel count results are normalized as the number of gels less than 200 µm in size contained in a 3 $m_2$ film sample of 1 mil thickness, or a volume of $7.62 \times 10^{-5}$ m³.

Dart Impact Strength, $F_{50}$: Measured on film as per procedure ASTM D 1709—Method A;

Elmendorf Tear—Measured on Film as per ASTM D 1922;

1% Secant Modulus: Measured on Film as per ASTM D 882; and

GPC. The Mw/Mn, Mz/Mw, the Mw (weight average molecular weight) and Mn (number average molecular weight) values, and % HMW component, etc. GPC measurements were as determined by gel permeation chromatography using crosslinked polystyrene columns; pore size sequence: 1 column less than 1000, 3 columns of mixed 5×10(7); 1,2,4-trichlorobenzene solvent at 145° C. with refractive index detection. The GPC data was deconvoluted into high and low molecular weight components by use of a "Wesslau model", wherein the β term was restrained for the low molecular weight peak to 1.4, as described by E. Broyer & R. F. Abbott, *Analysis of molecular weight distribution using multicomponent models*, ACS SYMP. SER. (1982), 197 (COMPUT. APPL. APPL. POLYM. SCI.), 45–64.

Comparative Example 1 ("C1") is a single reactor (gas phase) produced bimodal polyethylene having the properties listed in Tables 2 and 4. It was made using a bimetallic catalyst system similar to the catalyst composition described above for the inventive examples.

In order to determine the physical properties of the C1 resin, a granular sample of the C1 was obtained and blended with 1500 ppm Tetrakis[methylene(3,5-di-t-butyl-4-hydroxyhydrocinnamate)]methane, commonly known as IRGANOX 1010, 1500 ppm Tris(2,4-di-t-butylphenyl)phosphite (commonly known as IRGAFOS 168 and 1500 ppm zinc stearate. The blended material was melt homogenized under a nitrogen blanket on a laboratory scale Brabender single screw extruder. The FI, MFR and density of the melt homogenized material was measured and is reported in Table 2. Larger amounts of the same C1 were blended with 200 ppm IRGAFOS 168, 800 ppm IRGANOX 1010 and 1500 ppm zinc stearate to determine the film properties. This blend was compounded on a Farrel 18 UMSD at an SEI of 179 kW*H/tonn and 10.2% oxygen at 8.8 SCFM applied to the melt side of the flow dam. The melt homogenized product of this compounding procedure was converted into film, and the film process and physical properties are reported in Tables 3 and 4. The melt temperatures are the temperature at the downstream end of the mixing zone of the extruder.

Comparative Example 2 ("C2") is a Dow UNIPOL™ II 2100 bimodal poly(ethylene-co-1-butene) produced in a two-staged dual reactor gas phase process using a Ziegler-Natta type catalyst.

Comparative Example 3 ("C3") is a Mitsui HD7960 bimodal poly(ethylene-co-1-butene) produced in a two-staged slurry process, available from ExxonMobil Chemical Co.

Comparative Example 4 ("C4") is a Mitsui HD7755 bimodal poly(ethylene-co-1-butene) produced in a two-staged slurry process, available from ExxonMobil Chemical Co.

Comparative Example 5 ("C5") is a Alathon™ L5005 bimodal poly(ethylene-co-1-butene) produced in a two-staged process available from Equistar Chemicals.

TABLE 1

Process Parameters in forming the polyethylene compositions corresponding to examples 1 and 2, and polymer characteristics

|  |  | 1 | 2 |
|---|---|---|---|
| Process Parameter |  |  |  |
| amount of polymer collected in 24 hr | lbs (±10%) | 190,000 | 230,000 |
| $H_2/C_2$ Gas Ratio | Mol/mol | 0.011 | 0.011 |
| $C_4/C_2$ Gas Ratio | Mol/mol | 0.026 | 0.024 |
| $C_4/C_2$ Flow Ratio | Kg/kg | 0.0147 | 0.0152 |
| Ethylene partial pressure | Bara | 11.3 | 13.8 |
| Water/$C_2$ Flow Ratio | wt ppm | 20.8 | 20.1 |
| Ti Activity | Kg PE/kg catalyst | 8166 | — |
| TMA in resin | wt ppm | 113 | 113 |
| Reactor temperature | °C. | 95 | 95 |
| polyethylene composition |  |  |  |
| $I_{21}$ | dg/min | 8.5 | 8.75 |
| $I_{21}/I_2$ (MFR) |  | 122 | 105 |
| Density | g/cc | 0.951 | 0.951 |
| Elasticity |  | 0.57 | 0.52 |
| η 0.1 s$^{-1}$/200°C. | poise | 1,001,000 | 811,000 |
| $I_{21}$ HMW | dg/min | 0.338 | 0.442 |
| $I_{21}$ HMW-DSR | dg/min | 0.296 | 0.381 |
| % HMW-MFR | % | 54 | 57 |
| % HMW-DSR | % | 54 | 55 |
| % HMW-GPC | % | 64 | 65 |
| Mn | amu | 3119 | 4504 |
| Mw | amu | 263,733 | 257,857 |
| Mz | amu | 1,552,131 | 1,296,849 |
| Mw/Mn (MWD) |  | 84.54 | 57.24 |
| Mz/Mw |  | 5.89 | 5.02 |
| LMW-Mw | amu | 7191 | 8900 |
| HMW-MW | amu | 494,890 | 444,430 |
| HMW-MWD |  | 11 | 9.4 |

TABLE 2

Film compounding conditions and film properties of comparative and inventive examples 1 and 2

|  |  | C4 | C1 | 1 | 2 |
|---|---|---|---|---|---|
| Resin Properties |  |  |  |  |  |
| $I_{21}$ | dg/min | 10.6 | 10.9 | 8.5 | 8.75 |
| $I_{21}/I_2$ |  | 142 | 111 | 122 | 105 |
| Density | g/cm$^3$ | 0.951 | 0.948 | 0.951 | 0.951 |
| Elasticity |  | 0.60 | 0.52 | 0.57 | 0.52 |
| Extruder Conditions |  |  |  |  |  |
| Extruder Diameter | mm | 50 | 50 | 50 | 50 |
| Extruder L/D |  | 21 | 21 | 21 | 21 |
| Die Diameter | mm | 120 | 120 | 120 | 120 |
| Die Gap | mm | 1.4 | 1.4 | 1.4 | 1.4 |
| AVG Extruder Set Temp. | °C. | 190 | 190 | 190 | 190 |
| AVG Die Set Temp. | °C. | 200 | 200 | 200 | 200 |
| Stabilizer |  | Yes | Yes | Yes | Yes |
| Chilled Air |  | Yes | Yes | Yes | Yes |
| Extrusion Properties |  |  |  |  |  |
| Rate | Lbs/hr | 199.7 | 200.4 | 199.0 | 199.8 |
| Specific Die Rate | Lbs/hr/in | 13.5 | 13.5 | 13.4 | 13.5 |
| Melt Temperature | °C. | 180.3 | 184 | 178.6 | 178.0 |

TABLE 2-continued

Film compounding conditions and film properties
of comparative and inventive examples 1 and 2

|  |  | C4 | C1 | 1 | 2 |
|---|---|---|---|---|---|
| Specific Throughput | Lbs/hr/rpm | 1.90 | 1.86 | 1.88 | 1.84 |
| Motor Load (relative to maximum for the instrument) | % | 85 | 87 | 82 | 80 |
| Pressure | psi | 7370 | 8065 | 7676 | 7415 |
| Film Properties |  |  |  |  |  |
| BUR |  | 4 | 4 | 4 | 4 |
| Gauge | mil | 0.5 | 0.5 | 0.5 | 0.5 |
| Gauge Variation |  | 16% | 13% | 27% | 22% |
| FAR |  | +50 | −20 | +40 | +40/50 |
| Dart Impact Strength $F_{50}$ | g | 228 | 189 | 174 | 192 |
| Elmendorf Tear - MD | g/mil | 20 | 17 | 19 | 20 |
| Elmendorf Tear - TD | g/mil | 31 | 46 | 23 | 37 |
| 1% Secant Modulus MD | psi | 153,000 | 145,000 | 186,000 | 165,000 |
| 1% Secant Modulus TD | psi | 148,000 | 142,000 | 154,000 | 152,000 |

The examples 1 and 2, produced in a single gas phase reactor using a bimetallic catalyst as described, produced polymer compositions having the unexpected benefit of improved processability over prior single reactor bimodal resins and a dual-reactor produced bimodal resin commonly known. The lower power, as also represented in FIGS. 1 and 2, represent a dramatic improvement in film production, as the inventive polymer compositions can be more easily processed, thus improving its commercial value. This is especially so given that the $I_{21}$ values for examples 1 and 2 are lower than that for both comparative examples, thus the expectation that the flow through the die to form the film would take more power, not less.

As an even further advantage, the melt temperature of the inventive examples 1 and 2 is significantly lower when compared to the comparative examples, thus also an improvement in processability. A melt temperature of less than 180° C., and less than 179° C. in a particular embodiment, is found in the inventive examples, while still maintaining a high specific die rate of at least 10 lbs polymer/hr/inch of die circumference and high specific throughput. Thus, if motor loads and/or pressures were applied to the inventive examples 1 and 2 comparable to the C1 and C4 examples, it is likely that the specific throughputs could be at least 1.90 lbs polyethylene/hr/rpm (0.863 kg/hr/rpm) higher at similar melt temperatures.

Reactor conditions for runs to produce the polyethylene compositions corresponding to film examples 3–9 are in Table 3 below. The polyethylene composition properties of those corresponding examples are found in Table 4. Film extrusion conditions for examples 3–9, and for determination of the relationship $T_m \leq 235 - 3.3\,(I_{21})$ and its specific embodiments, are as follows: an Alpine extruder line having a 50 mm grooved feed extruder, an L/D ratio of 21:1, a temperature profile of 180° C. flat across the extruder, and 190° C. flat across the die, 4:1 BUR (blow up ratio, the ratio of the initial bubble diameter to the die diameter) an output of 200 lbs/hr, and a 120 mm die with measured 1.4 mm die gap, using a high-density type screw design; also using single lip air ring (with cooled air) and internal bubble stabilizer; the HDPE screw being a 50 mm 21 d screw with a HDPE feed section (Alpine part no. 116882). The melt temperature $T_m$ was measured by an immersion thermocouple at the adapter section, near the exit of the extruder. Examples 3–9 were oxygen tailored similarly to C1. The extrusion properties and film properties of examples 3–9 are found in Tables 5 and 6.

The examples 3–9 exhibited no detectable odor, whereas the C1 sample has some odor upon extrusion. The examples 3–9, although oxygen tailored and thus exhibiting, on average, larger $I_{21}$ values and larger $I_2$ values, still show the improvements of the invention, as these resins are also more easily processed relative to the prior art resins.

TABLE 3

Polymerization conditions for Examples 3 through 9

| Parameter | Units | 3 | 4 | 5 | 6 | 7 | 8 | 9 |
|---|---|---|---|---|---|---|---|---|
| Amt. PE in 24 hrs | Tonnes | 156 | 156 | 156 | 156 | 156 | 156 | 156 |
| $H_2/C_2$ | mol/mol | 0.0085 | 0.0085 | 0.009 | 0.009 | 0.009 | 0.009 | 0.009 |
| $C_4/C_2$ | mol/mol | 0.0272 | 0.0272 | 0.021 | 0.021 | 0.021 | 0.0183 | 0.0183 |
| $C_4/C_2$ flow ratio | kg/kg | 0.0166 | 0.0166 | 0.0122 | 0.0122 | 0.0122 | 0.0122 | 0.0122 |
| $C_2$ partial pressure | kPa | 1400 | 1400 | 1400 | 1400 | 1400 | 1400 | 1400 |
| Ti activity | Kg PE/kg catalyst | 6766 | * | 5327 | 5927 | 6762 | 5819 | 5915 |
| TMA added to reactor | Wt ppm | 103 | * | 96 | 102 | 107 | 101 | 123 |
| Reactor temp | ° C. | 95 | 95 | 95 | 95 | 95 | 95 | 95 |

*not recorded, expected to be approximately the same as other readings

TABLE 4

Polyethylene properties in film examples 3 through 9 and comparatives

| example | density (g/cm³) | $I_{21}$ (dg/min) | $I_{21}/I_2$ | $M_w/M_n$ | elasticity |
|---|---|---|---|---|---|
| C1 | 0.950 | 10.9 | 123 | 34 | 0.62 |
| C2 | 0.949 | 10.38 | 160 | 26 | 0.68 |
| C3 | 0.952 | 11.9 | 133 | — | 0.60 |
| C5 | 0.950 | 8.6 | 152 | — | 0.64 |
| 3 | 0.949 | 8.39 | 137 | 84 | 0.62 |
| 4 | 0.949 | 9.38 | 157 | 83 | 0.65 |
| 5 | 0.949 | 11.12 | 168 | 90 | 0.62 |
| 6 | 0.948 | 8.09 | 146 | 82 | 0.61 |
| 7 | 0.947 | 8.61 | 146 | 81 | 0.61 |
| 8 | 0.950 | 10.01 | 174 | 91 | 0.64 |
| 9 | 0.951 | 11.5 | 196 | 110 | 0.65 |

TABLE 5

Other polyethylene properties of examples 3 through 9 and comparatives

| Property | Units | 3 | 4 | 5 | 6 | 7 | 8 | 9 | C1 | C2 | C3 | C5 |
|---|---|---|---|---|---|---|---|---|---|---|---|---|
| Resin Properties | | | | | | | | | | | | |
| LMW Mw | | 7823 | 8620 | 8644 | 8698 | 8709 | 7959 | 6389 | 16311 | 21454 | — | — |
| HMW Mw | | 444443 | 480543 | 505190 | 539136 | 456299 | 494016 | 493254 | 406641 | 481868 | — | — |
| HMW MWD | | 8.5 | 7.3 | 7.2 | 7.6 | 6.5 | 7.0 | 12.0 | 6.3 | 4.3 | — | — |

TABLE 6

Film properties and extrusion characteristics film examples 3 through 9 and comparatives

| Property | Units | 3 | 4 | 5 | 6 | 7 | 8 | 9 | C1 | C2 | C3 | C5 |
|---|---|---|---|---|---|---|---|---|---|---|---|---|
| Extrusion Properties | | | | | | | | | | | | |
| Melt Temp | ° C. | 201 | 196 | 195.5 | 206 | 204 | 194 | 193 | 206 | 209 | 200.5 | 212 |
| Pressure | psi | 8550 | 8200 | 8250 | 8980 | 8780 | 8210 | 8110 | 8480 | 8200 | 7960 | 8450 |
| Motor Load | % | 77% | 71% | 74% | 78% | 77% | 75% | 74% | 82% | 82% | 77% | 80% |
| Specific Throughput | lbs/hr/rpm | 1.16 | 1.17 | 1.18 | 1.17 | 1.17 | 1.18 | 1.18 | 1.20 | 1.18 | 1.19 | 1.19 |
| Gauge | mil | 0.5 | 0.5 | 0.5 | 0.5 | 0.5 | 0.5 | 0.5 | 0.5 | 0.5 | 0.5 | 0.5 |
| BUR | | 4:1 | 4:1 | 4:1 | 4:1 | 4:1 | 4:1 | 4:1 | 4:1 | 4:1 | 4:1 | 4:1 |
| Film Properties | | | | | | | | | | | | |
| FAR | | 40/50 | 40/50 | 40/50 | 40/50 | 40/50 | 40/50 | 50 | 20 | 50 | 50 | 40 |
| gel count | | 199 | 34 | 36 | 29 | 32.5 | 31 | 28 | 442 | — | 218 | 33 |
| DDI | g | 182 | — | 201 | 178 | 180 | 194 | — | 234 | 219 | 270 | 166 |
| MD Tear | g/mil | 21 | — | 24 | 20 | 22 | 25 | — | 21 | 24 | 17 | 22 |
| TD Tear | g/mil | 30 | — | 31 | 32 | 27 | 31 | — | 39 | 41 | 53 | 27 |
| MD Tensile Strength | psi | 11632 | — | 11389 | 12324 | 11156 | 11140 | — | 10959 | 12228 | 11019 | 11406 |
| TD Tensile Strength | psi | 11639 | — | 10942 | 10404 | 12275 | 10863 | — | 10298 | 12746 | 11784 | 10816 |
| MD Tensile Elongation | % | 278% | — | 288% | 251% | 252% | 275% | — | 295% | 299% | 408% | 279% |
| TD Tensile Elongation | % | 278% | — | 273% | 304% | 288% | 259% | — | 297% | 322% | 356% | 385% |
| MD Yield Strength | psi | 5840 | — | 5376 | 6009 | 5786 | 5374 | — | 5114 | 5186 | 5325 | 5293 |
| TD Yield Strength | psi | 4697 | — | 4575 | 4548 | 4725 | 4568 | — | 4652 | — | 4335 | 4627 |
| MD Yield Elongation | % | 3% | — | 4% | 5% | 5% | 5% | — | 4% | — | 8% | 5% |
| TD Yield Elongation | % | 6% | — | 4% | 4% | 4% | 4% | — | 4% | — | 5% | 6% |

The film quality of examples 3–9 are excellent as indicated by the high FAR values and the low gel counts. Given the equally high FAR values of examples 1 and 2, it can be inferred that they too have similarly low gel counts. Thus, the oxygen tailoring has little to no influence on film quality.

Further, the advantages of the films of the present invention can be seen from the data. In particular, at relatively high specific throughputs, the motor loads, expressed as a percentage of the maximum motor load allowable for the equipment used, are significantly lower—all less than 77 to 78%—for the examples 3 through 9, while that for each comparative was typically higher; further, the melt temperatures for the inventive examples were significantly lower than for most of the inventive examples. Also, it can be seen that examples 3–9 follow the relationship $T^m \leq 235-3.3$ $(I_{21})$, wherein the polyethylene composition is extruded at a specific throughput of from 1 to 1.5 lbs/hr/inch, as represented graphically at FIG. 6. Further, the more general relationship $T_m \leq T_m^x - 3.3$ $(I_{21})$ is also followed when comparing the examples 1 and 2, and the examples 3–9, each set having been extruded under differing conditions and using a different extruder screws.

Figure 6:
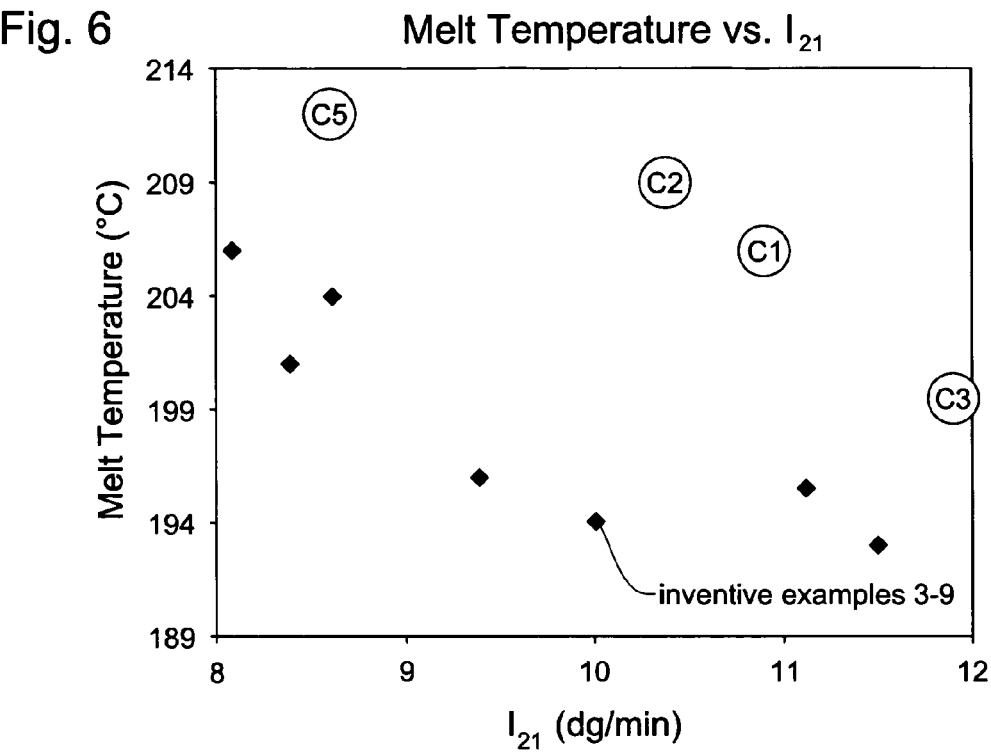
FIGS. 6 and 7 are graphical representations of melt index ($I_{21}$) values of the inventive examples 3 and 5 through 9 (♦) and comparative examples (numbered open circles) versus motor loads and pressures upon extrusion to form a film of 0.5 mil gauge, extruded at a specific throughput of from 1.16 to 1.20 lbs/hr/rpm.
Figure 7:
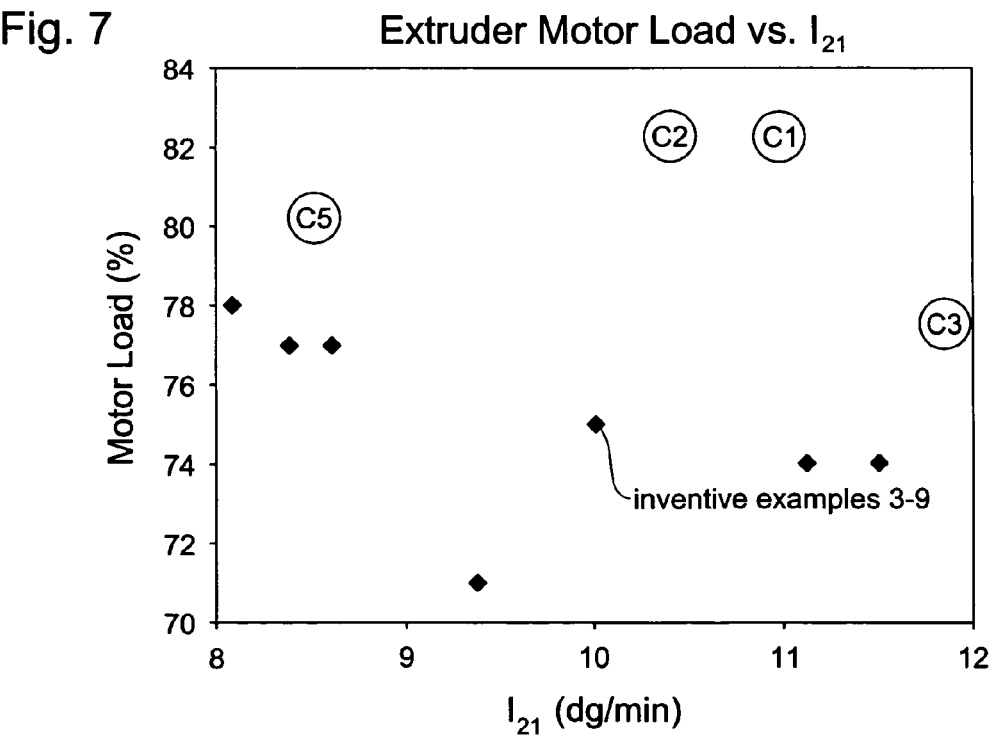

More particularly, the advantages of the present invention are evident by comparing the motor loads (%) and melt temperatures of the inventive example 3–9 extrusions versus the comparative examples in Table 5, and graphically in FIGS. 6 and 7. While the trend for the inventive examples is towards decreasing melt temperatures and motor loads as $I_{21}$ increases, the comparative resins fall higher for both the extruder motor load and melt temperature.

It can be seen from the specific throughput, melt temperature and motor load data that the present invention offers a significant improvement over the prior art, even over prior disclosed single reactor bimodal products such as disclosed in H.-T. Liu et al. in 195 MACROMOL. SYMP. 309–316 (July, 2003). The processing parameters of the films in Liu et al—from resins having an $I_{21}$ of 6.2 dg/min and density of 0.95 g/cm³—are not as advantageous as the films of the current invention. It should be noted, as see in the FIGS. 3–5 of the present invention, that the bimodal resins of Liu et al. are similar to the C1 above. Certainly, the present invention is shown to offer significant improvement over other prior art bimodal resins having a $I_{21}$ value of less than 20 and density with the range of 0.930 and 0.970 g/cm³, this improvement quite significant when taking into account the large commercial quantities of resin being processed in commercial-scale extruders.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the scope of the present invention. Further, certain features of the present invention are described in terms of a set of numerical upper limits and a set of numerical lower limits. It should be appreciated that ranges formed by any combination of these limits are within the scope of the invention unless otherwise indicated.

What is claimed is:

1. A film comprising a polyethylene composition possessing a density of between 0.944 and 0.962 g/cm³, an $I_{21}$ value of from 6 to 14 dg/min, and a Mw/Mn value of from greater than 35; characterized in that the polyethylene composition extrudes at a melt temperature, $T_m$, that satisfies the following relationship:

$$T_m < 235 - 3.3 \, (I_{21})$$

wherein the polyethylene composition is extruded at a specific throughput of from 1.1 to 1.3 lbs/hr/rpm; and wherein the polyethylene composition formed into a film has a gel count of less than 100.

2. The film of claim 1, wherein the polyethylene composition comprises a high molecular weight component having a weight average molecular weight of greater than 50,000 amu and a low molecular weight component having a weight average molecular weight of less than 50,000 amu.

3. The film of claim 2, wherein the low molecular weight component possesses a weight average molecular weight of less than 40,000 amu.

4. The film of claim 2, wherein the low molecular weight component possesses a weight average molecular weight of less than 30,000 amu.

5. The film of claim 1, wherein fillers, antioxidants and other additives are present to less than 2 wt % in the polyethylene composition.

6. The film of claim 1, wherein the polyethylene composition has an $M_w/M_n$ value of from greater than 40.

7. The film of claim 1, wherein polyethylene composition has a z-average molecular weight distribution of from 3 to 20.

8. The film of claim 1, wherein the polyethylene composition has an elasticity of greater than 0.60.

9. The film of claim 1, wherein the film has a gel count of less than 50.

10. The film of claim 1, wherein the polyethylene composition is produced in a single continuous gas phase reactor process.

11. A film comprising a polyethylene composition possessing a density of between 0.944 and 0.962 g/cm³, an $I_{21}$ value of from 6 to 14 dg/min, and a Mw/Mn value of from greater than 35; characterized in that the polyethylene composition extrudes at a melt temperature, $T_m$, that satisfies the following relationship:

$$T_m \leq 235 - 3.3 (I_{21})$$

wherein the polyethylene composition is extruded at a specific throughput of from 1.1 to 1.3 lbs/hr/rpm; and wherein the polyethylene composition formed into a film has a gel count of less than 100.

12. The film of claim 11, wherein the polyethylene composition comprises a high molecular weight component having a weight average molecular weight of greater than 50,000 amu and a low molecular weight component having a weight average molecular weight of less than 50,000 amu.

13. The film of claim 12, wherein the low molecular weight component possesses a weight average molecular weight of less than 40,000 amu.

14. The film of claim 12, wherein the low molecular weight component possesses a weight average molecular weight of less than 30,000 amu.

15. The film of claim 11, wherein fillers, antioxidants and other additives are present to less than 2 wt % in the polyethylene composition.

16. The film of claim 11, wherein the polyethylene composition has an Mw/Mn value of from greater than 40.

17. The film of claim 11, wherein polyethylene composition has a z-average molecular weight distribution of from 3 to 20.

18. The film of claim 11, wherein the polyethylene composition has an elasticity of greater than 0.60.

19. The film of claim 11, wherein the film has a gel count of less than 50.

20. The film of claim 11, wherein the polyethylene composition is produced in a single continuous gas phase reactor process.

21. A film comprising a polyethylene composition possessing a density of between 0.944 and 0.962 g/cm$^3$, an $I_{21}$ value of from 6 to 14 dg/min, and a Mw/Mn value of from greater than 35; characterized in that the polyethylene composition extrudes at a melt temperature, $T_m$, that satisfies the following relationship:

$$T_m \leq 235 - 3.3(I_{21})$$

wherein the polyethylene composition is extruded at a specific throughput of from 1.1 to 1.3 lbs/hr/rpm; and wherein the polyethylene composition formed into a film has a gel count of less than 100.

22. The film of claim 21, wherein the polyethylene composition comprises a high molecular weight component having a weight average molecular weight of greater than 50,000 amu and a low molecular weight component having a weight average molecular weight of less than 50,000 amu.

23. The film of claim 22, wherein the low molecular weight component possesses a weight average molecular weight of less than 40,000 amu.

24. The film of claim 22, wherein the low molecular weight component possesses a weight average molecular weight of less than 30,000 amu.

25. The film of claim 21, wherein fillers, antioxidants and other additives are present to less than 2 wt % in the polyethylene composition.

26. The film of claim 21, wherein the polyethylene composition has an Mw/Mn value of from greater than 40.

27. The film of claim 21, wherein polyethylene composition has a z-average molecular weight distribution of from 3 to 20.

28. The film of claim 21, wherein the polyethylene composition has an elasticity of greater than 0.60.

29. The film of claim 21, wherein the film has a gel count of less than 50.

30. The film of claim 21, wherein the polyethylene composition is produced in a single continuous gas phase reactor process.

31. A film comprising a polyethylene composition possessing a density of between 0.944 and 0.962 g/cm$^3$, an $I_{21}$ value of from 6 to 14 dg/min, and a Mw/Mn value of from greater than 35; characterized in that the polyethylene composition extrudes at a melt temperature, $T_m$, that satisfies the following relationship:

$$T_m \leq 235 - 3.3\ (I_{21})$$

wherein the polyethylene composition is extruded at a specific throughput of from 1.1 to 1.3 lbs/hr/rpm; and wherein the polyethylene composition formed into a film has a gel count of less than 100.

32. The film of claim 31, wherein the polyethylene composition comprises a high molecular weight component having a weight average molecular weight of greater than 50,000 amu and a low molecular weight component having a weight average molecular weight of less than 50,000 amu.

33. The film of claim 32, wherein the low molecular weight component possesses a weight average molecular weight of less than 40,000 amu.

34. The film of claim 32, wherein the low molecular weight component possesses a weight average molecular weight of less than 30,000 amu.

35. The film of claim 31, wherein fillers, antioxidants and other additives are present to less than 2 wt % in the polyethylene composition.

36. The film of claim 31, wherein the polyethylene composition has an Mw/Mn value of from greater than 40.

37. The film of claim 31, wherein polyethylene composition has a z-average molecular weight distribution of from 3 to 20.

38. The film of claim 31, wherein the polyethylene composition has an elasticity of greater than 0.60.

39. The film of claim 31, wherein the film has a gel count of less than 50.

40. The film of claim 31, wherein the polyethylene composition is produced in a single continuous gas phase reactor process.

* * * * *